United States Patent
Watanabe et al.

(10) Patent No.: US 6,721,499 B2
(45) Date of Patent: Apr. 13, 2004

(54) CAMERA

(75) Inventors: Toshimi Watanabe, Yokohama (JP); Toshiaki Maeda, Yokohama (JP); Hideo Hibino, Yamato (JP); Tadashi Ohta, Yokohama (JP)

(73) Assignees: Nikon Corporation, Tokyo (JP); Nikon Technologies, Inc., Tokyo (JP)

( * ) Notice: Subject to any disclaimer, the term of this patent is extended or adjusted under 35 U.S.C. 154(b) by 0 days.

(21) Appl. No.: 10/392,821

(22) Filed: Mar. 21, 2003

(65) Prior Publication Data

US 2003/0202788 A1 Oct. 30, 2003

(30) Foreign Application Priority Data

Apr. 26, 2002 (JP) ........................................ 2002-125952
Apr. 26, 2002 (JP) ........................................ 2002-125953

(51) Int. Cl.[7] .............................................. G03B 13/36
(52) U.S. Cl. ........................................ 396/127; 348/356
(58) Field of Search ................................ 396/125, 127, 396/104; 348/349–356

(56) References Cited

U.S. PATENT DOCUMENTS

2001/0000674 A1 * 5/2001 Yasuda ........................ 348/349
2003/0117517 A1 * 6/2003 Ogino ......................... 348/356

FOREIGN PATENT DOCUMENTS

| JP | A 6-62301 | 3/1994 | .......... H04N/5/232 |
| JP | A 9-181954 | 7/1997 | .......... H04N/5/232 |

* cited by examiner

Primary Examiner—W. B. Perkey
(74) Attorney, Agent, or Firm—Oliff & Berridge, PLC

(57) ABSTRACT

A camera includes an imaging element that picks up an image of an object through a taking-lens, an evaluation value calculator that calculates focus evaluation value based upon a picked-up imaging signal, a selector that selects one focusing mode from a plurality of focusing modes, a focusing device that performs a focusing operation based upon the focus evaluation value and the selected focusing mode and a rebooting device that reboots the focusing operation after the focusing operation finishes, wherein further includes an evaluation value memory device that stores a plurality of focus evaluation values calculated by the evaluation value calculator in time sequence after the focusing operation finishes and a fluctuation evaluator that evaluates fluctuation in focus evaluation value stored into the evaluation value memory device, wherein, when the rebooting device reboots the focusing operation, the selector selects one focusing mode from a plurality of focusing modes.

31 Claims, 13 Drawing Sheets

CAMERA

INCORPOLATION BY REFERENCE

This application is based upon and claims priority of Japanese Patent Applications No. 2002-125952 and 2002-125953 filed on Apr. 26, 2002, the contents being incorporated herein by reference.

BACKGROUND OF THE INVENTION

1. Field of the Invention

The present invention relates to a camera capable of a focusing adjustment by a contrast method using an imaging signal output by an imaging element.

2. Description of Related Art

In this field of the art, as one of ways of automatic focus (AF) adjustments for use in a camera, there is a so-called contrast method. According to this method, an object is picked up by an imaging element such as CCD or so and an in-focus position is determined by using an imaging signal in a focus area. More specifically, a component of a given spatial frequency band of an imaging signal in a focus area is extracted through a band pass filter (BPF). By integration of these absolute values in an area, a focus evaluation value in causing a focusing operation is calculated. This focus evaluation value represents a contrast size, high or low and a peak of focus evaluation value shows a highest contrast. Namely, a peak value position turns out to be an in-focus position.

As a way of detecting a peak value position, what is called a mountain climb control method and a full scan control method are known. A single AF mode in which an automatic focusing is performed only when a halfway-depress switch is halfway depressed and a focus point is held unless a halfway-depressed switch is released and a continuous AF mode in which an automatic focusing operation is always being performed continuously regardless of an operation of a halfway-depress switch are known.

SUMMARY OF THE INVENTION

In a continuous AF mode, it is pointed out that when a halfway-depress switch is turned on, a suitable focusing control method is not always selected. It is an object of this invention to provide a camera enabling to select a suitable focusing control method when a halfway-depress switch is turned on.

In order to achieve the object, according to one aspect of this invention, there is provided a camera which includes an imaging element that picks up an image of an object through a taking-lens, an evaluation value calculator that calculates focus evaluation value based upon an imaging signal output by the imaging element, a selector that selects one focusing mode from a plurality of focusing modes, a focusing device that performs a focusing operation of the taking-lens based upon the focus evaluation value and the selected focusing mode and a rebooting device that reboots the focusing operation after the focusing operation performed by the focusing device finishes, an evaluation value memory device that obtains and stores a plurality of focus evaluation values calculated in time sequence by the evaluation value calculator after the focusing operation performed by the focusing device finishes and a fluctuation evaluator that evaluates fluctuation in focus evaluation value based upon a plurality of focus evaluation values stored into the evaluation value memory device, wherein, when the rebooting device reboots the focusing operation, the selector selects one focusing mode from a plurality of focusing modes based upon an evaluation result of fluctuation in focus evaluation value by the fluctuation evaluator.

According to claim 2 set forth in this invention, there is provided the camera disclosed in claim 1, wherein a plurality of focusing modes have a mountain climb focus mode using a so-called mountain climb control method that seeks a peak value of the focus evaluation value while moving the taking-lens in a direction with the focus evaluation value getting larger every a single cycle of calculating the focus evaluation value and a full range scan focus mode using a so-called full range scanning control method that seeks a peak value of the focus evaluation value by scanning across an overall movement range for use in focusing the taking-lens.

According to claim 3 set forth in this invention, there is provided the camera disclosed in claim 2, wherein the selector selects the mountain climb focus mode when the fluctuation evaluator judges that fluctuation in focus evaluation value is monotonous.

According to claim 4 set forth in this invention, there is provided the camera disclosed in claim 3, wherein a monotonous fluctuation in focus evaluation value means a monotonous increase or decrease in focus evaluation value within a given period of time.

According to claim 5 set forth in this invention, there is provided the camera disclosed in claim 2, wherein the selector selects the full range scan control mode when the fluctuation evaluator judges that fluctuation in focus evaluation value is not monotonous.

According to claim 6 set forth in this invention, there is provided the camera disclosed in claim 2, wherein the selector moves the taking-lens to an end of the movement range and selects the mountain climb focus mode when the fluctuation evaluator judges that fluctuation in focus evaluation value is not monotonous.

According to claim 7 set forth in this invention, there is provided the camera disclosed in claim 6, wherein the end of the movement range is an end at a closest distance away.

According to claim 8 set forth in this invention, there is provided a camera which includes an imaging element that picks up an image of an object through a taking-lens, an evaluation value calculator that calculates focus evaluation value based upon an imaging signal output by the imaging element, a selector that selects one focusing mode from a plurality of focusing modes, a focusing device that performs a focusing operation of the taking-lens based upon the focus evaluation value and the selected focusing mode and a rebooting device that reboots the focusing operation after the focusing operation performed by the focusing device finishes, wherein further comprising a plurality of focusing modes that have a mountain climb focus mode using a so-called mountain climb control method that seeks a peak value of the focus evaluation value while moving the taking-lens in a direction with the focus evaluation value getting larger every a single cycle of calculating the focus evaluation value and a full range scan focus mode using a so-called a full range scanning focus control method that seeks a peak value of focus evaluation value by scanning across an overall movement range for use in focusing the taking-lens, wherein, when the rebooting device reboots the focusing operation, the selector selects the full range scan focus mode when the selector judges that focus evaluation value at rebooting is smaller than a given value.

According to claim 9 set forth in this invention, there is provided the camera disclosed in claim 8, wherein the given value is a value calculated based upon focus evaluation value at a conclusion of the focusing operation.

According to claim 10 set forth in this invention, there is provided a camera which includes an imaging element that picks up an image of an object through a taking-lens, an evaluation value calculator that calculates focus evaluation value based upon an imaging signal output by the imaging element, a selector that selects one focusing mode from a plurality of focusing modes, a focusing device that performs a focusing operation of the taking-lens based upon the focus evaluation value and the selected focusing mode and a rebooting device that reboots the focusing operation after the focusing performed by the focusing device finishes, wherein, when the rebooting device reboots the focusing operation, the selector selects one focusing mode based upon a shooting condition.

According to claim 11 set forth in this invention, there is provided the camera disclosed in claim 10, wherein the shooting condition is a condition based upon a focal length of the taking-lens.

According to claim 12 set forth in this invention, there is provided the camera disclosed in claim 11, wherein a plurality of focusing modes have a mountain climb focus mode using a so-called mountain climb control method that seeks a peak value of the focus evaluation value while moving the taking-lens in a direction with the focus evaluation value getting larger every a single cycle of calculating the focus evaluation value and a full range scan focus mode using a so-called a full range scanning focus control method that seeks a peak value of focus evaluation value by scanning across an overall movement range for use in focusing the taking-lens and the selector selects the full range scan focus mode when the selector judges that the focal length is shorter than a given length.

According to claim 13 set forth in this invention, there is provided the camera disclosed in claim 10, wherein the shooting condition is a condition based upon a plurality of shooting modes predetermining a plurality of shooting conditions in accordance with a shooting situation.

According to claim 14 set forth in this invention, there is provided the camera disclosed in claim 13, wherein a plurality of focusing modes have a mountain climb focus mode using a so-called mountain climb control method that seeks a peak value of the focus evaluation value while moving the taking-lens in a direction with the focus evaluation value getting larger every a single cycle of calculating the focus evaluation value and a full range scan focus mode using a so-called a full range scanning focus control method that seeks a peak value of focus evaluation value by scanning across an overall movement range for use in focusing the taking-lens.

According to claim 15 set forth in claim 14, there is provided the camera disclosed in claim 13, wherein the selector selects the mountain climb focus mode when the shooting mode is any of a portrait, a close-up or a sport shooting mode.

According to claim 16 set forth in this invention, there is provided the camera disclosed in claim 14, wherein the selector selects the full range scan focus mode when the shooting mode is any of a long distance or a night scenery shooting mode.

According to claim 17 set forth in this invention, there is provided a camera which includes an imaging element that picks up an image of an object through a taking-lens, an evaluation value calculator that calculates focus evaluation value based upon an imaging signal output by the imaging element, a selector that selects one focusing mode from a plurality of focusing modes, a focusing device that performs a focusing operation of the taking-lens based upon the focus evaluation value and the selected focusing mode and a rebooting device that reboots the focusing operation after the focusing operation performed by the focusing device finishes, wherein the plurality of focusing modes include a full range scan focus mode using a so-called full scanning control method that seeks a peak value of the focus evaluation value by scanning across an overall range for use in focusing the taking-lens and at rebooting the focusing operation by the rebooting device, the selector selects the full range scan focus mode when amount of fluctuation in the focus evaluation value at rebooting with reference to the focus evaluation value at concluding the focusing operation is larger than a given value.

According to claim 18 set forth in this invention, there is provided the camera disclosed in claim 17, wherein the given value is a value obtained based upon focus evaluation value at concluding the focusing operation.

According to claim 19 set forth in this invention, there is provided the camera disclosed in claim 17, wherein the plurality of focusing modes include a mountain climb focus mode using a so-called mountain climb control method that seeks a peak value of the focus evaluation value while moving the taking-lens in a direction with the focus evaluation value getting larger every a single cycle of calculating the focus evaluation value.

According to claim 20 set forth in this invention, there is provided a camera which includes an imaging element that picks up an image of an object through a taking-lens, an evaluation value calculator that calculates focus evaluation value based upon an imaging signal output by the imaging element, a selector that selects one focusing mode from a plurality of focusing modes including a focusing mode using a so-called full scanning control method that seeks a peak value of the focus evaluation value by scanning across an overall range for use in focusing the taking-lens, a focusing device that performs a focusing operation of the taking-lens based upon the focus evaluation value and the selected focusing mode, an AF selector that selects a so-called continuous AF mode continuously repeating the focusing operation by the focusing device and a rebooting device that reboots the focusing operation after the focusing operation performed by the focusing device finishes, wherein, when the focusing device is disable to perform the focusing operation in the continuous AF mode selected by the AF selector, a selector selects a focusing mode using a full range scanning control method when a focusing operation is rebooted by the rebooting device.

According to claim 21 set forth in this invention, there is provided a camera which includes an imaging element that picks up an image of an object through a taking-lens, an evaluation value calculator that calculates focus evaluation value based upon an imaging signal output by the imaging element, a focus instruction switch that instructs a focusing operation when a switch is turned on, a selector that selects at least one focusing mode from any of a first focusing mode or a second focusing mode based upon the focus evaluation value when the focus instruction switch is turned on and a focusing device that performs a focusing operation of the taking-lens based upon the focus evaluation value and the selected one focusing mode when the focus instruction switch is turned on.

According to claim 22 set forth in this invention, there is provided the camera disclosed in claim 21, wherein the first focusing mode is a so-called mountain climb control method that seeks a peak value of the focus evaluation value while moving the taking-lens in a direction with the focus evaluation value getting larger every a single cycle of calculating the focus evaluation value and the second focusing mode is a so-called a full range scanning focus control method that seeks a peak value of focus evaluation value by scanning across an overall movement range for use in focusing the taking-lens.

According to claim 23 set forth in this invention, there is provided the camera disclosed in claim 22, wherein, when the focus evaluation value at a time of the focus instruction switch being turned on is larger than a given value, the selector selects the mountain climb control method.

According to claim 24 set forth in this invention, there is provided the camera disclosed in claim 22, wherein, when the focus evaluation value at a time of the focus instruction switch being turned on is smaller than a given value, the selector selects the full range scanning focus control method.

According to claim 25 set forth in this invention, there is provided a camera which includes an imaging element that picks up an image of an object through a taking-lens, an evaluation value calculator that calculates focus evaluation value based upon an imaging signal output by the imaging element, a selector that selects at least one focusing mode from any of a first focusing mode or a second focusing mode, a focusing device that performs a focusing operation of the taking-lens based upon the focus evaluation value and the selected one focusing mode, an evaluation memory device that stores the focus evaluation value when a focusing operation finishes, a re-focus instruction switch that instructs again the focusing device to perform a focusing operation when a switch is turned on and an evaluation value comparison device that obtains amount of fluctuation in the focus evaluation value at a time of there-focus instruction switch being turned on with reference to the focus evaluation value stored by the evaluation value memory device, wherein, when the re-focus instruction switch is turned on, the selector selects the one focusing mode based upon the amount of fluctuation obtained by the evaluation value comparison device.

According to claim 26 set forth in this invention, there is provided the camera disclosed in claim 25, wherein the first focusing mode is a so-called mountain climb control method that seeks a peak value of the focus evaluation value while moving the taking-lens in a direction with the focus evaluation value getting larger every a single cycle of calculating the focus evaluation value and the second focusing mode is a so-called a full range scanning focus control method that seeks a peak value of focus evaluation value by scanning across an overall movement range for use in focusing the taking-lens.

According to claim 27 set forth in this invention, there is provided the camera disclosed in claim 26, wherein, when the amount of fluctuation is smaller than a given value, the selector selects the mountain climb control method.

According to claim 28 set forth in this invention, there is provided the camera disclosed in claim 27, wherein the given value is a value obtained based upon the focus evaluation value stored into the evaluation value memory device.

According to claim 29 set forth in this invention, there is provided the camera disclosed in claim 26, wherein, when the amount of fluctuation is larger than a given value, the selector selects the full range scanning focus control method.

According to claim 30 set forth in this invention, there is provided a camera which includes an imaging element that picks up an image of an object through a taking-lens, an evaluation value calculator that calculates focus evaluation value based upon an imaging signal output by the imaging element, a selector that selects one focusing mode from a plurality of focusing modes including a focusing mode using a so-called full range scanning focus control method that seeks a peak value of focus evaluation value by scanning across an overall movement range for use in focusing the taking-lens, a focusing device that performs a focusing operation of the taking-lens based upon the focus evaluation value and the selected focusing mode, an AF selector that selects a so-called continuous AF mode continuously repeating the focusing operation by the focusing device and a focus instruction switch that instructs the focusing device to perform a focusing operation when a switch is turned on, wherein, when the focusing device is disable to perform the focusing operation in the continuous AF mode selected by the AF selector, the selector selects a focusing mode using the full range scanning control method at a time the focus instruction switch is turned on.

According to claim 31 set forth in this invention, there is provided the camera disclosed in claim 30, wherein the plurality of focusing modes include a focusing mode using a so-called mountain climb control method that seeks a peak value of the focus evaluation value while moving the taking-lens in a direction with the focus evaluation value getting larger every a single cycle of calculating the focus evaluation value.

BRIEF DESCRIPTION OF THE DRAWINGS

FIG. 2 is a main flowchart that starts up when a camera is turned on.

DETAILED DESCRIPTION OF THE PREFERRED EMBODIMENTS

An embodiment of this invention is explained by referring to attached figures.

Figure 1:
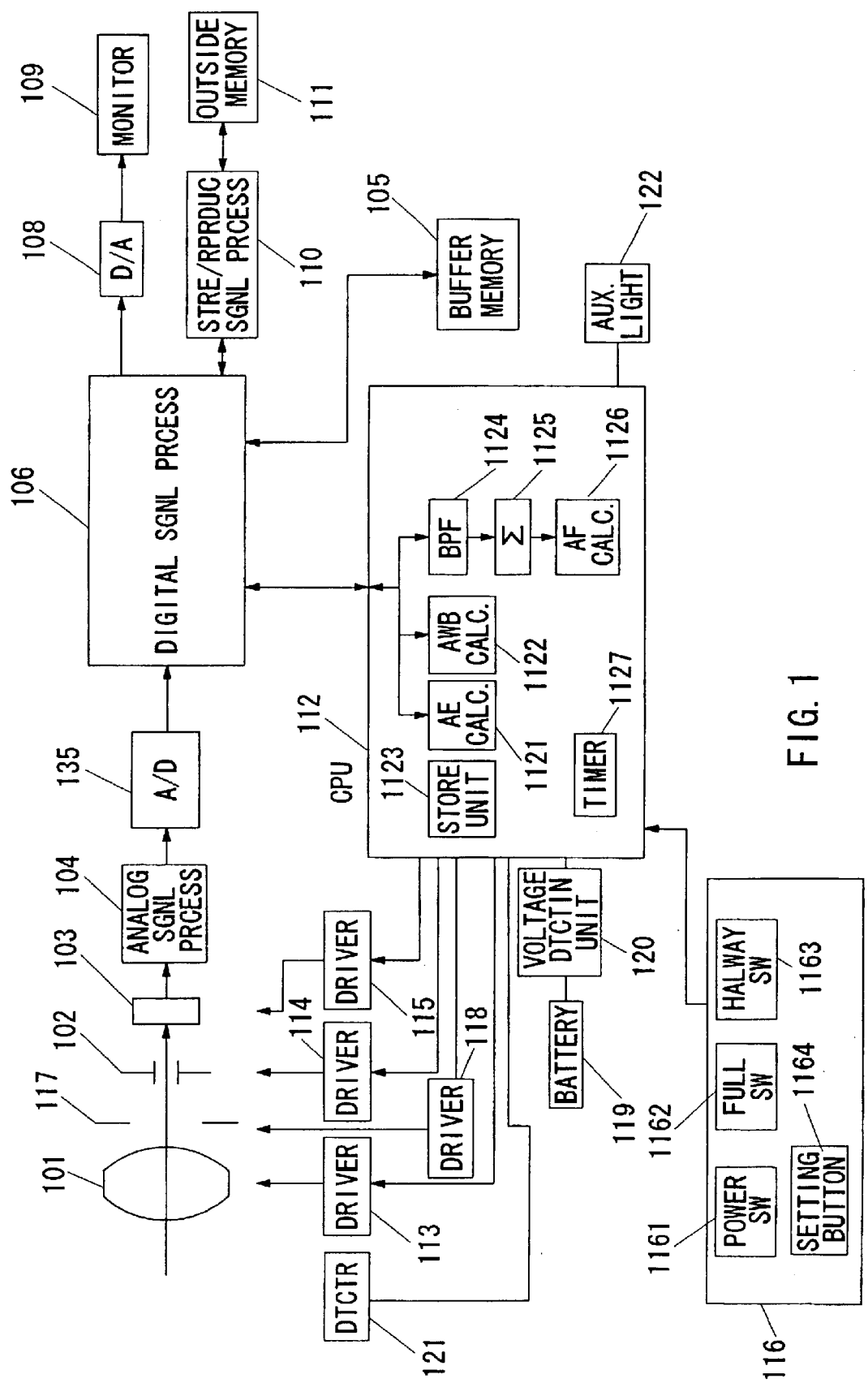
FIG. 1 is a function block diagram of an AF (auto focus) digital still camera of a first embodiment in accordance with this invention.

FIG. 1 is a function block diagram of an auto focus (AF) digital camera according to a first embodiment of this invention. Taking-lens 101 is an interchangeable taking-lens and provided with ROM (not shown) storing a lens information regarding f-number (maximum aperture) in use or so. When taking-lens 101 is attached on a lens mount of a camera body, detection unit 121 of a body reads out a lens information and information is stored into storage unit 1123. As taking-lens 101 is a zoom lens, it includes a focusing lens for a focus adjustment and a zooming lens for changing a focal length. Taking-lens 101 is driven by driver 113. Driver 113 is provided with a zoom driving mechanism, its driving circuit of a zooming lens, a focus driving mechanism and its driving circuit of a focusing lens. And also, each circuit is controlled by CPU 112 respectively. Unless otherwise described here, it is assumed that moving a taking-lens means to move a focusing lens in accordance with this invention.

Taking-lens 101 forms an object image on an image plane of imaging element 103. Imaging element 103 is a photoelectric conversion imaging element outputting an electric signal corresponding to a light intensity of an object image formed on an image plane and as a photoelectric conversion imaging element, a solid-state imaging element such as CCD or MOS (Metal-Oxide Semiconductor) is used. Imaging element 103 is driven by driver 115 controlling timing of an extraction of a signal. Diaphragm 102 is provided between taking-lens 101 and imaging element 103. Diaphragm 102 is driven by driver 114 having a diaphragm driving mechanism and its driving circuit. An image signal from solid-state imaging element 103 is input into analog signal processing circuit 104 where a processing of a correlated dual sampling (CDS) or so is performed.

An imaging signal processed by analog signal processing circuit 104 is converted from an analog signal into a digital signal by A/D converter 135. Various image processing such as a contour compensation, gamma control and so are performed on A/D converted signal in digital signal processing circuit 106. Digital signal processing circuit 106 includes signal processing circuits such as a gain control circuit, an AE integration circuit, a brightness signal creation circuit, a color difference creation circuit and so. Buffer memory 105 is a flash memory capable of storing as many data as plural frames picked up by imaging element 103 and A/D converted data is stored into buffer memory 105 temporarily. Digital signal processing circuit 106 reads out data stored into buffer memory 105 and performs the foregoing processing on data and processed data is stored again into buffer memory 105.

CPU 112 is connected to digital signal processing circuit 106 and drivers 113~115 and the like and performs a sequential control of a camera operation. AE calculation unit 1121 of CPU 112 performs an auto exposure calculation based upon an imaging signal from imaging element 103 and a coefficient of a white balance adjustment is calculated in AWB calculation unit 1122 of CPU 112. Band pass filter (BPF) 1124 extracts a component of a high frequency of a band responding to each characteristic based upon an imaging signal in a focus detection area provided in an taking-image field.

In a case where a plurality of focus detection areas are provided, a signal per each focus detection area is read out in order and an extraction processing per each focus detection area is performed in order by BPS 1124. An example that there is provide one focus detection area will be explained.

Each output of BPF 1124 is input into evaluation value calculation unit 1125 and each focus evaluation value is calculated respectively by integrating an absolute evaluation value of a high-frequency component at evaluation value calculation device 1125. AF calculation unit 1126 performs an AE calculation by a contrast method based upon these absolute evaluation values. CPU 112 adjusts a position of a focusing lens of taking-lens 101 using a calculation result of AF calculation unit 1126 and causes a focusing operation.

Operation unit 116 connected to CPU 112 is provided with power switch 1161 that turns on or off a camera, full-depress switch 1162 and halfway-depress switch 1163 that switch on or off coupling with a release button and setting button 1164 for use in selection of a shooting mode and the like. A shooting mode to be set by setting button 1164 includes a normal to be later explained, scenic, portrait, sports, close-up and night scenery shooting modes. With an operation of these switches or button, a signal in response to the operation is input into CPU 112.

A numeral 119 represents a battery and its voltage is detected by voltage detector 120. A numeral 118 is a driver to drive shutter 117. Auxiliary light for AF 122 illuminates an object at a dim light. CPU 112 is provided with storage unit 1123 storing various data and timer 1127. Timer 1127 is used for various counting. According to this embodiment, it is used to count a time to reboot a focusing operation once a focus in point is obtained.

Image data processed variously by digital signal processing circuit 106 are stored into buffer memory 105 temporarily and then via record/reproduction signal processing circuit 110, they are stored into outside storage medium 111 such as a memory card and like. When image data is stored into storage medium 111, data is compressed in, generally a given compression format, for instance, a JPEG format. Record/reproduction signal processing circuit 110 is responsible for performing a data compression when storing image data into outside storage medium 111 and a data extension when reading out compressed image data from outside storage medium 111. Record/reproduction signal processing circuit 110 includes an interface for data transmission to and from outside memory medium 111.

Monitor 109 is a liquid crystal display unit for use in displaying a photographed object image and also reproducing image data stored into outside storage medium 111. In a case where an image is displayed on monitor 109, an image data stored into buffer memory 105 is read out and D/A converter 108 converts from a digital image data to an analog image data. Then, an image is displayed on monitor 109 with this analog/imaging signal.

Displaying an object image picked up by imaging element 103 on monitor 109 takes two forms. One display form is such a case where a release operation is not performed and an object image being repeatedly picked up by imaging element 103 is successively displayed on a monitor by updating a picked-up object image, being called a through image. Another form is a so-called freeze image that displays an image picked up by imaging element 103 for a given period of time after releasing a camera shutter.

There is a correlation between a degree of an image blur and a contrast. In a contrast method, a focusing operation is performed using a principle that an image contrast becomes at its maximum when the image is focused. Whether a contrast is high or low can be evaluated based upon a size of a high-frequency component of an imaging signal. That is, a high-frequency component of an imaging signal is extracted by BPF 1124 and let what an absolute value of a high-frequency component at evaluation value calculation unit 1125 is integrated be focus evaluation value. This focus evaluation value reaches a peak when an image comes to focus and a contrast becomes at its maximum. As explained in the foregoing, AF calculation unit 1126 performs AF calculation based upon focus evaluation value. CPU 112 adjusts a position of a focusing lens of taking-lens 101 using a calculation result of AF calculation unit 1126 and causes a focusing operation.

Figure 2:
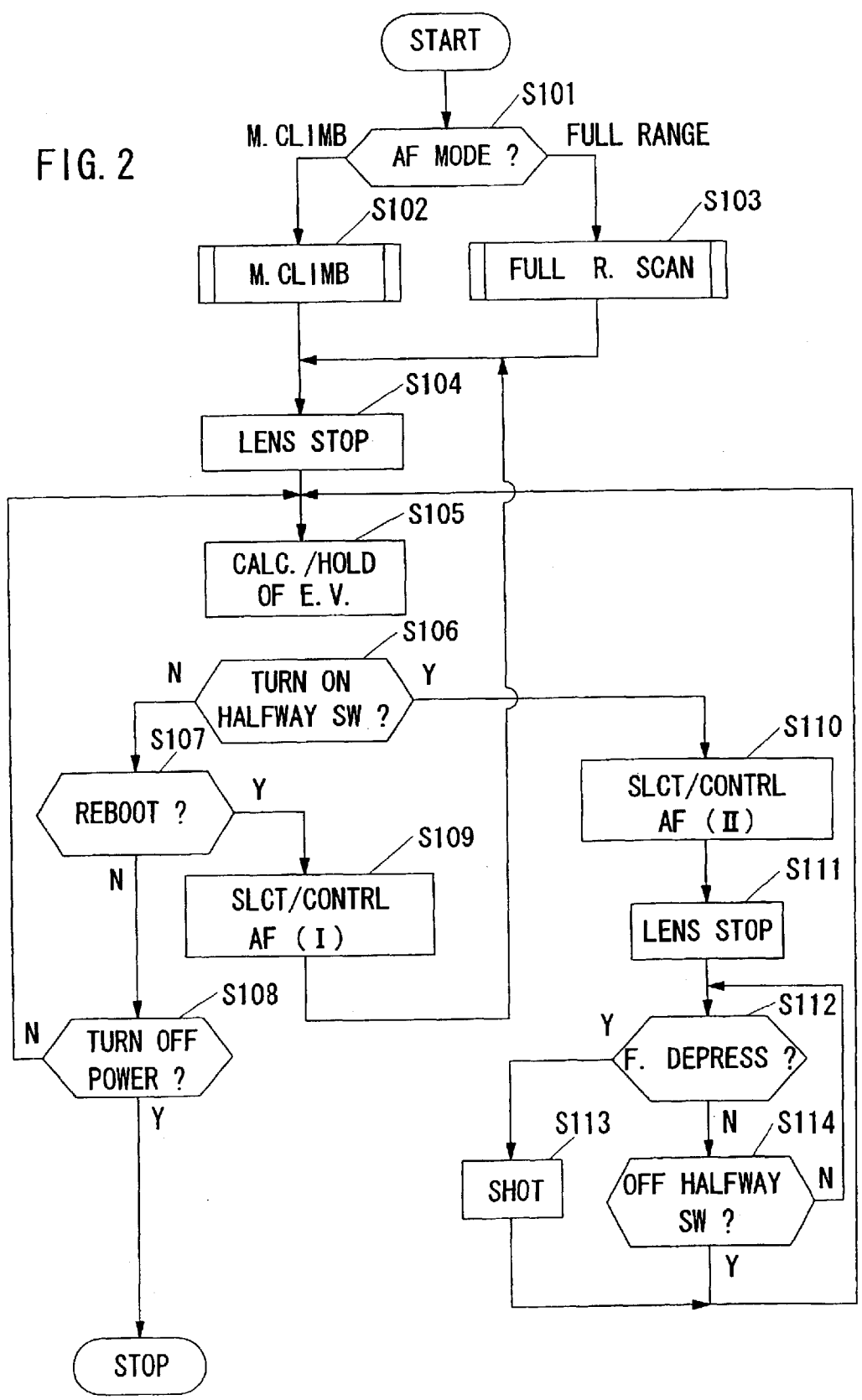

A camera operation in accordance with an embodiment of this invention is explained by referring to FIGS. 2~13. FIG. 2 is a booted main flow when power switch 1161 is turned on. A program is stored into a memory (not shown) and CPU 112 executes a program.

In step S101, whether an AF mode is a mountain climb focus mode or a full range scan mode is judged. When an AF mode is judged a mountain climb focus mode, a flow proceeds to step S102 and focusing operation is executed in a mountain climb focus control method. Or when it is judged that an AF mode is a full range scanning mode, a flow proceeds to step S103 and focusing operation is executed in a full range scanning control method.

A mountain climb and full range scanning focus control methods are a focusing control method that a camera employs in accordance with various conditions when executing an auto focusing. A camera of this embodiment is provided with a single AF mode and also a continuous AF mode selectable by a user regarding an auto focusing. A single AF mode (hereinafter called S-AF) is to perform an AF operation only when halfway-depress switch 1163 is halfway depressed and to maintain an in-focus position unless a halfway depressing is released once an object is focused. A continuous AF mode (hereinafter called C-AF) is to perform an AF operation continuously at all times regardless of a status of halfway-depress switch 1163. A switching of these modes is performed via an operation of setting button 1164 of FIG. 1.

A flowchart of FIG. 2 is figured to be applicable to any choice of S-AF or C-AF. Thus, in step S101, when an AF mode is set in any mode of S-AF or C-AF, it is judged which AF method, a mountain climb or a full range scanning method, is to be selected. When referring to an AF mode in accordance with this embodiment, unless otherwise described, it is assumed that an AF mode hereinafter refers to a mountain climb focus mode or a full range scanning focus mode, not S-AF nor C-AF.

Before continuing an explanation of a flowchart of FIG. 2, focusing modes by a mountain climbing and full range scanning control methods will be explained. A so-called mountain climbing control method is to look for a peak value of focus evaluation value while moving a taking-lens towards a direction with focus evaluation value getting larger every a single cycle of calculating focus evaluation value. What is called a full range scanning control method is to obtain a peak value of focus evaluation values by scanning across an overall lens movement range for use in focusing a taking-lens. A mountain climbing and full range scanning control methods are known to the public.

Figure 13:
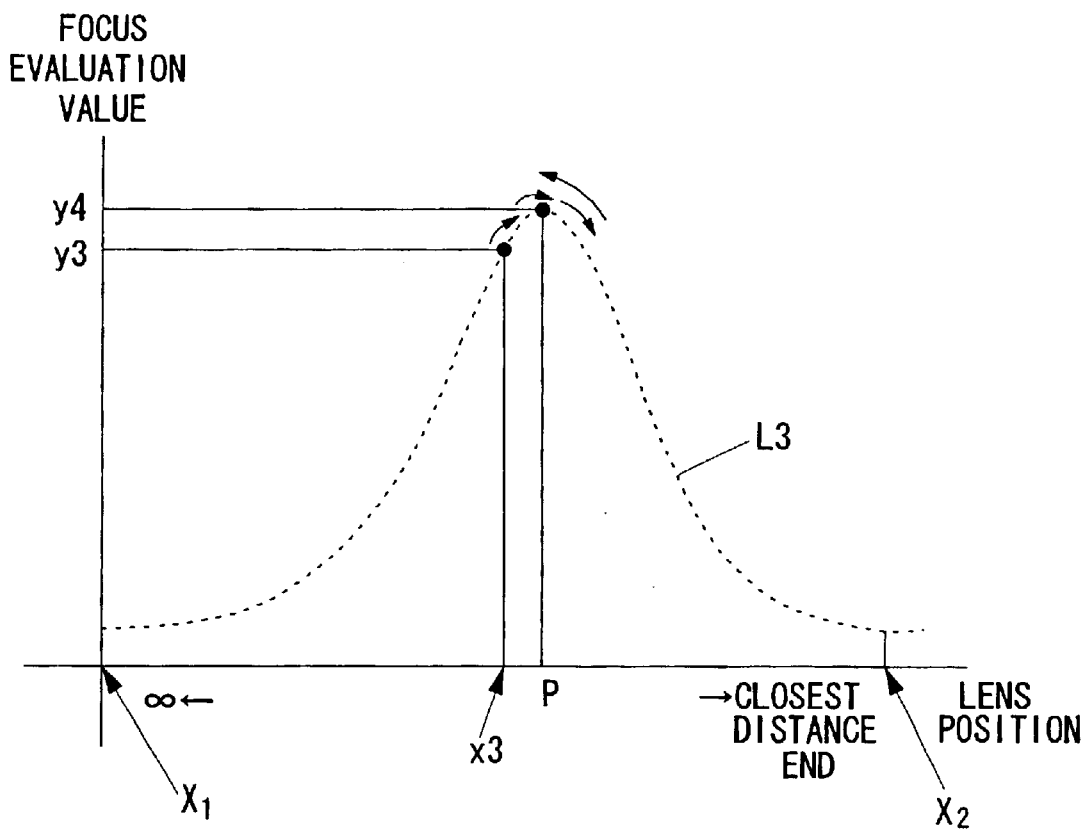
FIG. 13 is a flowchart explaining a concept of a mountain climb and full range scan focusing control methods.

FIG. 13 is a diagram explaining a concept of a mountain climbing and full range scanning control methods. L3 shows focus evaluation value curve that will be gained against an object. X3 is a lens position at a start time of a mountain climbing and focus evaluation value at this moment is y3. Once a focusing operation starts, for instance, a lens moves towards a closest distance end by a given distance and then focus evaluation value is calculated. In FIG. 13, when a lens moves towards a closest distance end (but just in front of lens position P), obtained focus evaluation value is larger than that of lens position x3. Therefore, it is judged that in-focus position P exists in an area at a closest distance away.

And then, a cycle that focus evaluation value each is calculated while moving a lens towards an area at a closest distance away by a given distance is repeated. Namely, while moving a lens by a given distance towards a direction with focus evaluation value getting large, focus evaluation value is obtained each time. And also, latest focus evaluation value is compared with preceding, focus evaluation value and it is judged each time whether or not focus evaluation value decreases. Once a lens moves past an in-focus position, focus evaluation value decreases. At this moment, it becomes obvious that the largest value of calculated focus evaluation values is y4. Let's assume that lens position P is an in-focus position and a lens moves to a point with y4 of focus evaluation value. That is, by detecting a peak value of focus evaluation value, a lens moves to a position with a peak value as an in-focus position.

On the other hand, in a full range scanning control method, a taking-lens moves across a range from infinity point x1 to closest distance point x2 successively by a given distance unit. While a lens moves, focus evaluation value by a given distance unit is obtained successively. A range from infinity point x1 to closest distance point x2 is a scope where a taking-lens moves for focus. By evaluating a plurality of successively obtained focus evaluation values, largest focus evaluation value y4 is detected. Accordingly, a peak value of focus evaluation value is detected and a lens moves to a position since a peak value position is regarded as an in-focus position. Well, a lens may move from closest distance point x2 to infinity point x1.

Figure 3:
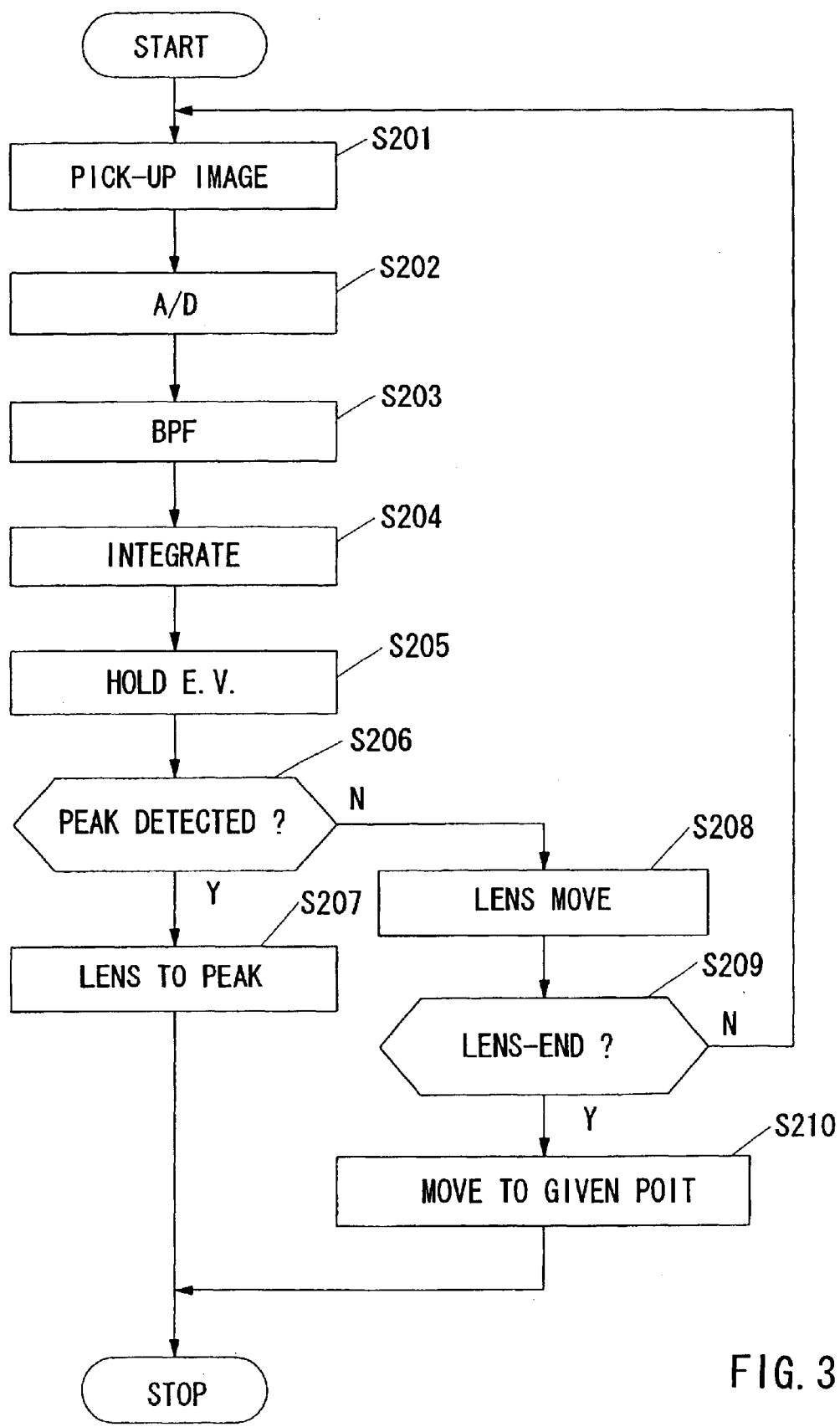
FIG. 3 is a flow chart explaining a mountain climb method focusing control mode.

In a mountain climbing control method, when a focusing operation starts from nearby in-focus position P, as shown in FIG. 13 for example, in-focus position P is immediately detected and a focusing operation can be finished in a short time. However, if an overall range from infinity point x1 to closest distance point x2 is scanned across by a mountain climbing control method, a mountain climbing control method will take much time compared with a full range scanning control method. Let us say, in a case where a lens moves across an overall range, a full range scanning control method finishes in a shorter time. FIG. 3 a flowchart explaining a focusing mode by a mountain climbing control method. In step S201 of FIG. 3, an imaging signal from imaging element 103 is readout. In step S202, A/D converter 135 converts an imaging signal from a digital signal to an analog one. In step S203, BPF 1124 extracts a high-frequency component of an imaging signal. In step S204, focus evaluation calculation unit 1125 integrates an absolute value of a high-frequency component. In step S205, CPU 112 stores an integrated value into a memory (not shown) as focus evaluation value.

In step S206, CPU 112 judges whether or not a peak focus evaluation value is detected. A way of detecting a peak value of focus evaluation value is that when focus evaluation value obtained at this moment is lower than preceding one, preceding focus evaluation value is judged a detected peak value. In a case where CPU 112 detects a peak focus evaluation value in step S206, a flow proceeds to step S207. In step S207, taking-lens 101 moves to a peak position and a processing of this mountain climbing control method finishes.

In step S206, in a case where CPU 112 judges that peak focus evaluation value has not yet been detected, a flow proceeds to step S208. In step S208, CPU 112 causes driver 113 to move taking-lens 101 by a given distance. A mountain climbing control method detects a direction with focus evaluation value getting larger at a time of starting a mountain climbing control method and then, taking-lens 101 moves towards that direction by a given distance every a single cycle. In step S209, it is judged whether taking-lens 101 reaches an end of a lens. Namely, it is judges whether taking-lens 101 reaches infinity point x1 or closest distance point x2 that is an end of a movement range for use in focusing a taking-lens. In step S209, when it is judged that taking-lens 101 has not yet reached an end of a lens, a flow gets back to step S201 and then a processing is repeated. In step S209, on the other hand, when it is judged that taking-lens 101 has reached an end of a lens, a flow proceeds to step S210. In step S210, taking-lens 101 moves to a given position and a processing finishes. Namely, this means that a peak value of focus evaluation value cannot be detected up to an end of a lens. It is, for instance, due to a low contrast. In other words, an object is of low contrast.

Figure 4:
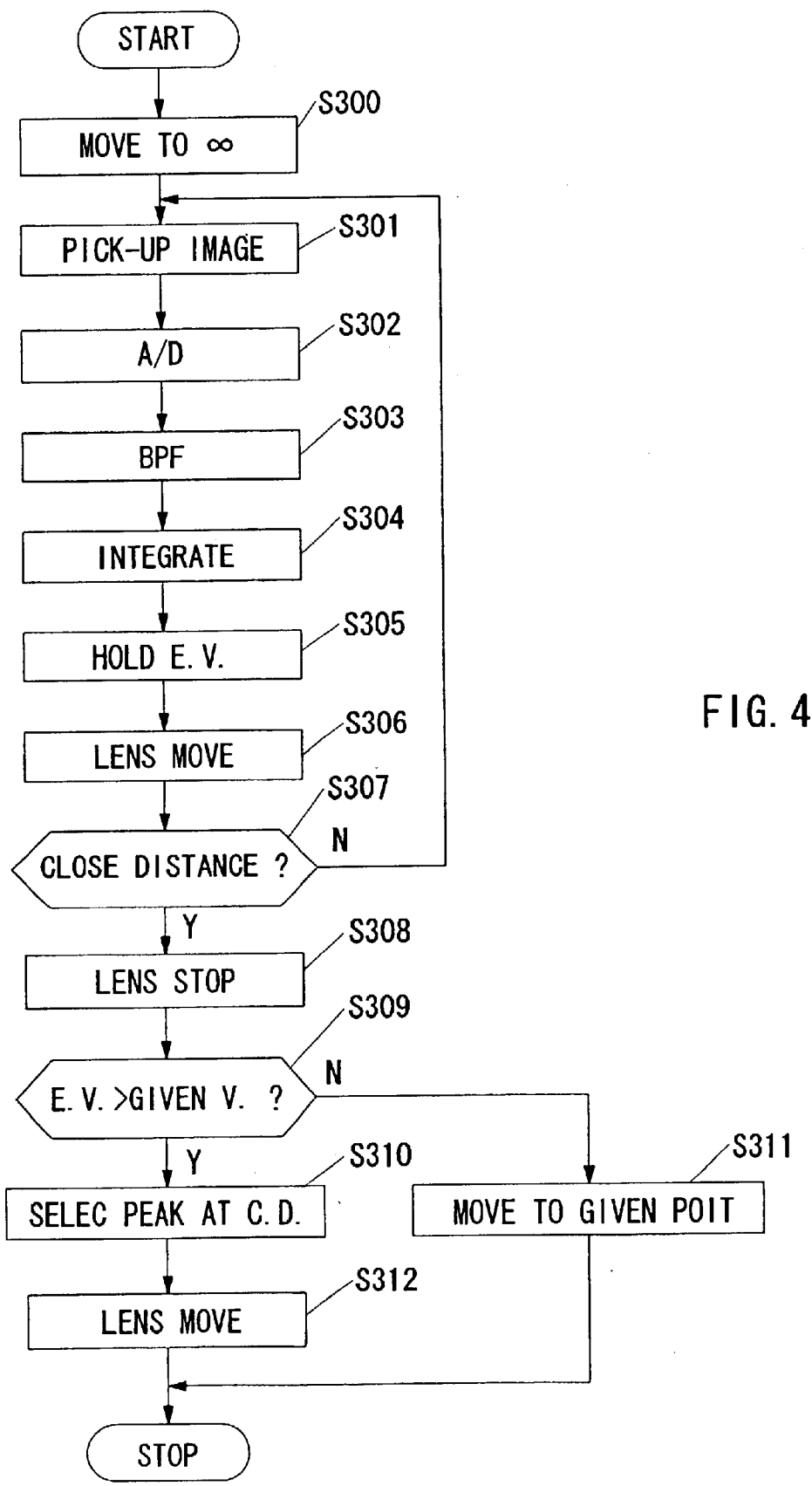
FIG. 4 is a flowchart explaining a full range scan method focusing control mode.

FIG. 4 a flowchart explaining a focusing operation in a full range scanning control method. Instep S300, CPU 112 causes driver 113 to move taking-lens 101 to infinity point x1. In step S301, an imaging signal from imaging element 103 is read out. In step S302, A/D converter 135 converts an imaging signal from an analog signal to a digital signal. In step S303, BPF 1124 extracts a high-frequency component of an imaging signal. In step S304, evaluation calculation unit 1125 integrates an absolute value of a high-frequency component of an imaging signal. In step S305, CPU 112 stores an integrated value into a memory as focus evaluation value.

In step S306, CPU 112 causes driver 113 to move taking-lens 101 by a given distance. In step S307, it is judged whether or not taking-lens 101 reaches closest distance point x2 and when it is judged that taking-lens 101 has not yet reached closest distance point x2, a flow gets back to step S301 and a processing is repeated. Accordingly, while taking-lens 101 moves from infinity point x1 to closest distance point x2 by a given distance, focus evaluation value can be obtained each time. Namely, focus evaluation value each can be obtained by scanning across an overall movement range for use in focusing taking-lens 101.

In the foregoing, it has been explained as an example that taking-lens 101 moves to infinity point x1 and then to closest distance point x2. However, a lens movement may be the other way round. Namely, first, taking-lens may move to closest distance point x2 and then, to infinity point x1. And when a full range scanning control method is chosen, a lens may be moved towards a nearer end judging a position of taking-lens 101 at this moment.

In step S307, when CPU 112 judges that taking-lens 101 reaches closest distance point x2, a flow proceeds to step S308. In step S308, a movement of taking lens 101 stops. In step s309, it is judged whether or not at least any of focus evaluation values is larger than a given value. When at least any of focus evaluation values is judged larger than a given value, a flow proceeds to step S310. When any of focus evaluation values is judged not larger than a given value, however, a flow proceeds to step S311. In step S311, taking-lens 101 moves to a given position. What any of focus evaluation values is not larger than a given value means that an object is of low contrast. In step s310, CPU 112 evaluates a plurality of focus evaluation values stored into a memory in step S305 and detects a peak position of focus evaluation value. When there is a plurality of peak positions, a peak position at a closest distance point away is selected. In a case where there is a plurality of objects, it is assumed that an object at a closest distance point away is generally a shooting target in a typical shooting mode. That's why a peak position at a closest distance point away is selected. In step S312, taking-lens 101 moves to a selected position and a processing finishes.

Incidentally, a mountain climbing control method can be called as a feed back control method and a full range scanning control method also as an open loop control method.

Let's get back to FIG. 2.

In step S104, taking-lens 101 stops at a point in focus or a given point. When a flow proceeds from steps S102 or S103, taking-lens 101 moving in a mountain climbing control method or in a full range scanning control method of step S103 stops. In step S105, focus evaluation value at a position where taking-lens 101 stops is obtained and stored into a memory. In step S106, it is judged whether or not halfway-depress switch 1163 is turned on.

When it is judged that halfway-depress switch 1163 is not turned on, a flow proceeds to step S107. In step S107, it is judged whether or not rebooting a focusing operation is required. In a case where C-AF is set, a focusing operation is repeated at all times unless halfway-depress switch 1163 is turned off. This repeat of a focusing operation is performed in a time unit counted by timer 1127. In step S107, based upon a counting performed by timer 1127, it is judged whether or not rebooting a next focusing operation is required. When timer 1127 judges that a given time has not elapsed, a flow proceeds to step S108 as rebooting is not required. In step s108, it is judged whether power switch 1161 of a camera is turned off. In step S108, when it is judged that a camera power is turned off, a processing finishes. But when it is judged that a power is not yet turned off, a flow gets back to step S105 and a processing is repeated. In step S107, when it is judged that rebooting a focusing operation is required, a flow proceeds to step S109. In step S109, a mountain climb focusing mode or a full range scan focusing mode is selected according to conditions and a focusing control is performed in a selected focusing mode.

Figure 5:
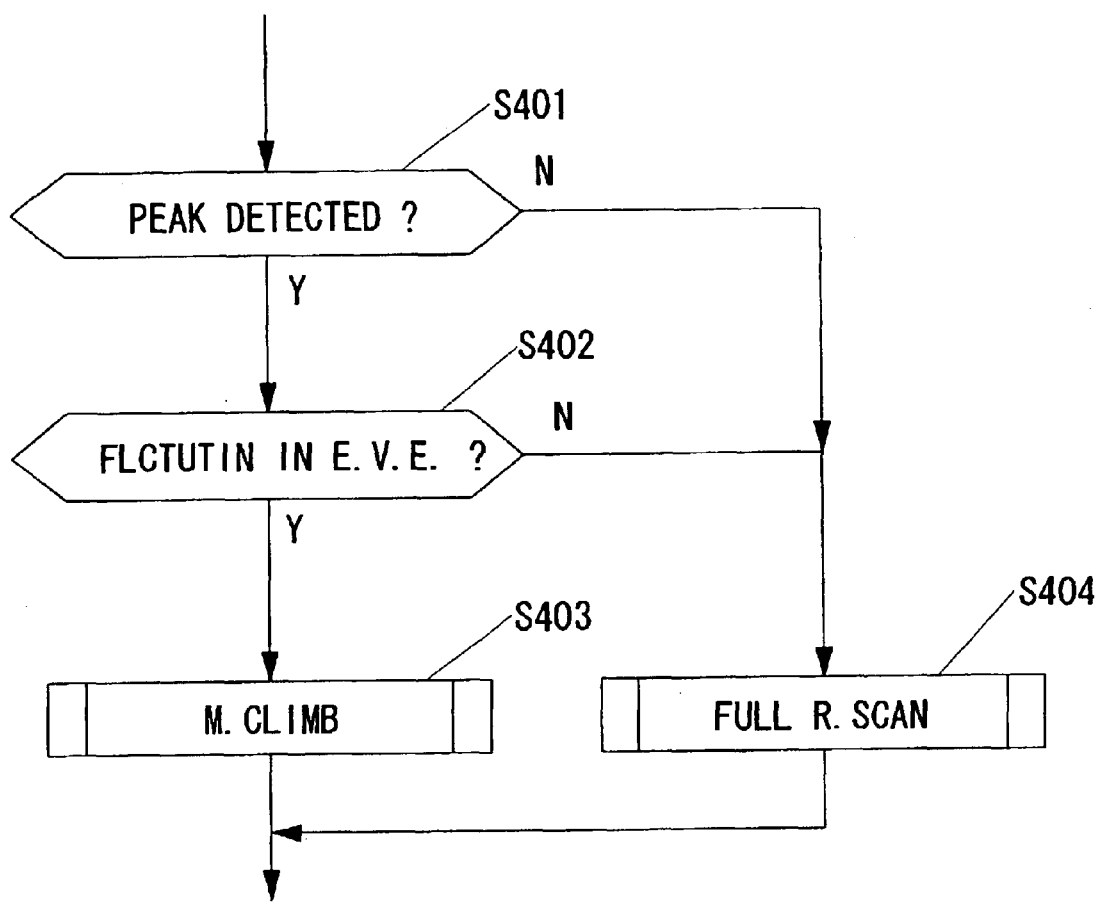
FIG. 5 is a flowchart detailing a processing of step S109 in FIG. 2.

FIG. 5 a flowchart detailing a processing of step S109. In step S401, it is judged whether or not a preceding focusing operation detected a peak point. Namely, it is judged whether or not a peak value of focus evaluation value was detected. When it was not detected, it is attributable to a low contrast and the like. When it is judged that a peak value was detected in step S401, a flow proceeds to step S402. In step S402, it is judged whether or not a fluctuation in focus evaluation value at a point where taking-lens 101 stops is monotonous. After taking-lens 101 stopped at a preceding focusing operation, until it is judged in step S207 that rebooting a focusing operation is necessary, in step s105, a plurality of focus evaluation values has been obtained at given timing and in time sequence and stored into a memory. CPU 112 evaluates a fluctuation in focus evaluation value based upon a plurality of focus evaluation values stored into a memory.

For example, whether a fluctuation in focus evaluation value increases or decreases monotonously is evaluated. Differential value (change per time unit) of focus evaluation value obtained at each point is calculated and when a code of differential value is constant, it is regarded as a monotonous fluctuation. When a code of differential value is + or −, it is regarded as a non-monotonous fluctuation. More concretely, a difference between a plurality of obtained each focus evaluation value and a immediate one preceding focus evaluation value is calculated and when a code of a difference is all the same, let a fluctuation in focus evaluation value be a monotonous fluctuation. But when a number of changing over a code is one or more than a given number, let a fluctuation in focus evaluation value be a non-monotonous fluctuation.

In step S402, when a fluctuation in focus evaluation value is judged monotonous, a flow proceeds to step S403 and a mountain climb focusing mode is executed. In step S402, when a fluctuation in focus evaluation value is judged non-monotonous, a flow proceeds to step S404 and a full range scan focusing mode is executed. A mountain climb and full range scan focusing modes are as described in FIGS. 3~4. Instep S401, however, when it is judged that a peak position isn't detected, a flow proceeds to step S404 and a full range scan focusing mode is executed. After a processing in FIG. 5 finishes, a flow gets back to step S104 and a processing is repeated.

Accordingly, when rebooting a focusing operation is required, a full range scan focusing mode can be executed in a case where a fluctuation in focus evaluation value has not been monotonous so far. In a case where a fluctuation in focus evaluation value has not been monotonous so far, there is a high possibility that an object has changed due to a panning, a composition change and so. In this case, a choice of a full range scan focusing mode rather than a mountain climb focusing mode has a high probability of enabling a faster focusing.

When a fluctuation in focus evaluation value is monotonous, it is unclear whether there is a change in an object or a shooting distance to an object varies, but there is a high possibility that a shooting distance to an object has changed. Thus, a mountain climb focusing mode is selected. Putting it another way, if only a shooting distance to an object has changed, a mountain climb focusing mode may realize a quicker focusing. Accordingly, when rebooting a focusing operation, a change of an object is surely grasped and an appropriate focusing mode is selectable in response to changes of an object. As a result, a quicker focusing (auto focusing) may be realized.

FIG. 2 is a flowchart applicable even in a case where a camera shooter selects any of S-AF or C-AF as explained in the foregoing. Thus, regardless of whether an AF mode is in S-AF or C-AF, when it is judged in step S401 that a peak position is not detected, a flow proceeds to step S404 and a full range scan focusing mode is executed. Accordingly, a focusing mode suitable for a low contrast is chosen and enables a quicker focusing.

Next, an example that halfway-depress switch 1163 is judged turned on in step S106 is explained. In C-AF mode, as explained in the foregoing, a focusing operation is repeated at a given time interval until halfway-depress switch 1163 is turned on. When halfway-depress switch 1163 is turned on, a focusing operation is performed immediately at this moment and an in-focus point is locked (AF lock). Then, without a break, full-depress switch 1162 is turned on shortly and a picture is shot at this in-focus point. In S-AF mode, taking-lens 101 has been locked at a preceding in-focus point until halfway-depress switch is turned on. When halfway-depress switch 1163 is turned on, a focusing operation is performed again immediately at this moment and an in-focus point is locked (AF lock). Following an AF lock, when full-depress switch 1162 is turned on, a picture is shot at this in-focus point.

In step S106, when it is judged that halfway-depress switch 1163 is turned on, a flow proceeds to step S110. In step S110, a mountain climb focusing or a full range scan mode is selected in response to a shooting condition and a focusing control is performed in a selected focusing mode.

Figure 6:
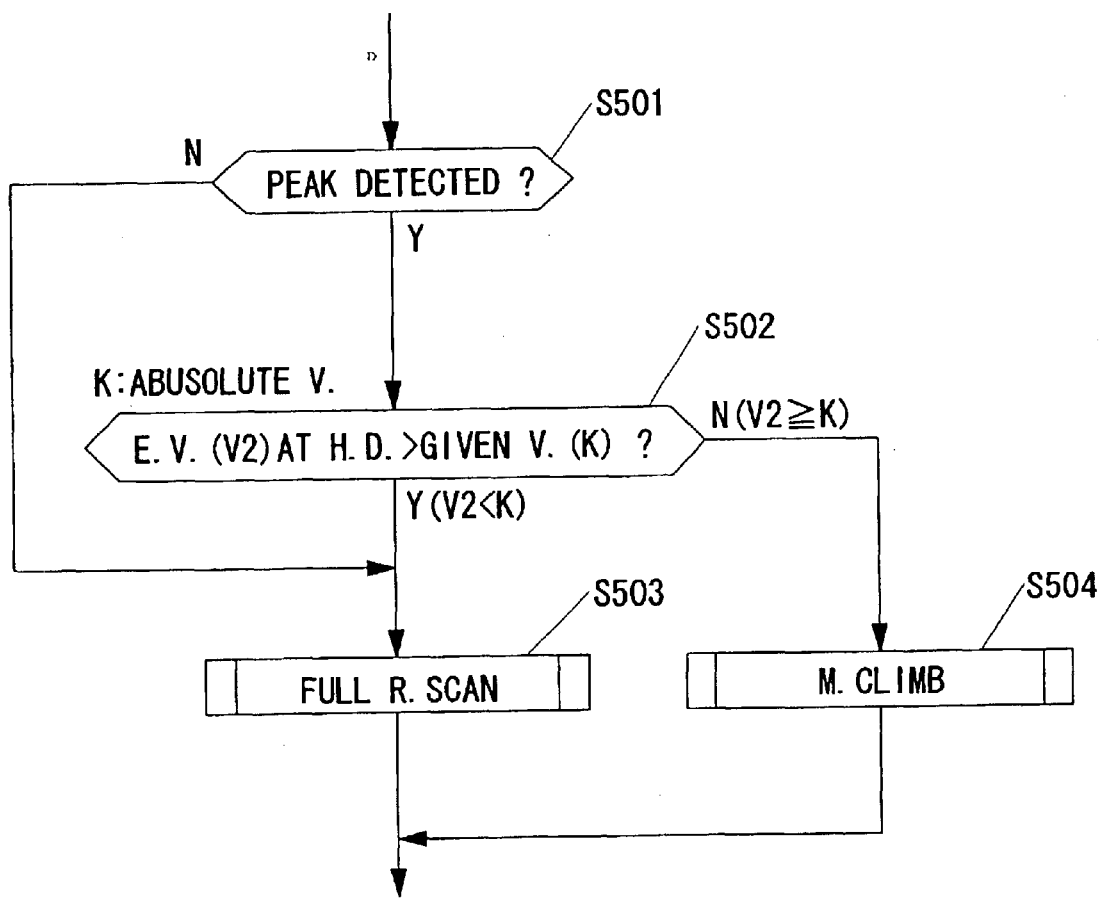
FIG. 6 is a flowchart detailing a processing of step S110 in FIG. 2.

FIG. 6 is a flowchart detailing a processing of step S110. In step S501, it is judged whether or not a preceding focusing operation detected a peak point. Namely, When a peak value could not be detected, it may be due to a low contrast or so. In step S501, a flow proceeds to step S502 when it is judged that a peak value was detected.

In step S502, when halfway-depress switch 1163 is turned on, it is judged whether focus evaluation value V2 is larger or smaller than given value K. In step S502, when focus evaluation value V2 is judged smaller than given value K (V2<K), a flow proceeds to step S503 and a full range scan focusing mode is executed. In step S502, when focus evaluation value V2 is judged more than given value K (V2≧K), a flow proceeds to step s504 and a mountain climb focusing mode is executed. A mountain climb and full range scan focusing modes are as shown in FIGS. 3 and 4.

In step S501, however, when a peak point is not detected, a flow proceeds to step S503 and a full range scan focusing mode is executed. A flow proceeds to step S111 of FIG. 2 after a processing of FIG. 6 finishes In step S111, taking-lens 101 stops. Taking-lens 101 moving in a mountain climb or full range scan focusing mode stops. In step S112, it is judged whether or not full-depress switch 1162 is turned on. When it is judged in step S112 that switch 1162 is turned on, a flow proceeds to step S113 and a processing of photography is executed. In step S112, when it is judged that full-depress switch 1162 is not turned on, a flow proceeds to step s114 and it is judged whether or not halfway-depress switch 1163 is turned off. In step S114, when it is judged that halfway-depress switch 1163 is not turned off, a flow gets back to step S1112 and a processing is repeated. When a processing of photography finishes in step S113 and it is judged in step S114 that halfway-depress switch 1163 is turned off, a flow gets back to step S105 and a processing is repeated.

Accordingly, when focus evaluation value at a time of halfway-depress switch 1163 being turned on is smaller than a given value, a choice of a full range scan focusing mode is made. In a case where focus evaluation value is smaller than a given value, there is a high possibility that a noticeable change has occurred in an object. Thus, a choice of a full range scan focusing mode has a high provability of enabling a quicker focusing. On the contrary, when focus evaluation value is larger than a given value, a possibility of a lens being nearby an in-focus point is high even if focus evaluation value varies. In this case, a choice of a mountain climb focusing mode provides a high provability of enabling a quicker focusing. Accordingly, when rebooting a focusing operation by turning on halfway-depress switch 1163, as an appropriate focusing mode is selectable in response to changes in an object, a quicker focusing (auto focus) can be realized.

In a mountain climb focusing mode, when taking-lens 101 is close to an in-focus point, quick focusing is possible. But, in a mountain climb focusing mode, in a case where there is a noticeable change in an object, let us say, in addition to an original object at a long distance away, another object appears at a close distance away and they compete against each other, for instance, a shooting object at a close distance away might not be focused. In this case, a full range scan focusing mode takes time compared with a mountain climb focusing method, but as complete focus evaluation values covering an overall movement range have been already obtained, a full range scan focusing mode has a merit that a full range scan enables a taking-lens to focus on a targeted object even if objects at a long and a close distance away compete against each other.

A flowchart of FIG. 2 is applicable even when a shooter selects any of S-AF or C-AF as explained before. Thus, regardless of any of an AF mode setting, S-AF or C-AF, when it is judged in step S501 of FIG. 6 that a peak point was not detected, a flow proceeds to step S504 and a full range scan focusing mode is executed. Namely, even in C-AF mode, if a preceding focusing operation was performed in a low contrast, a full range scan focusing mode is selected when turning on halfway-depress switch 1163.

Figure 7:
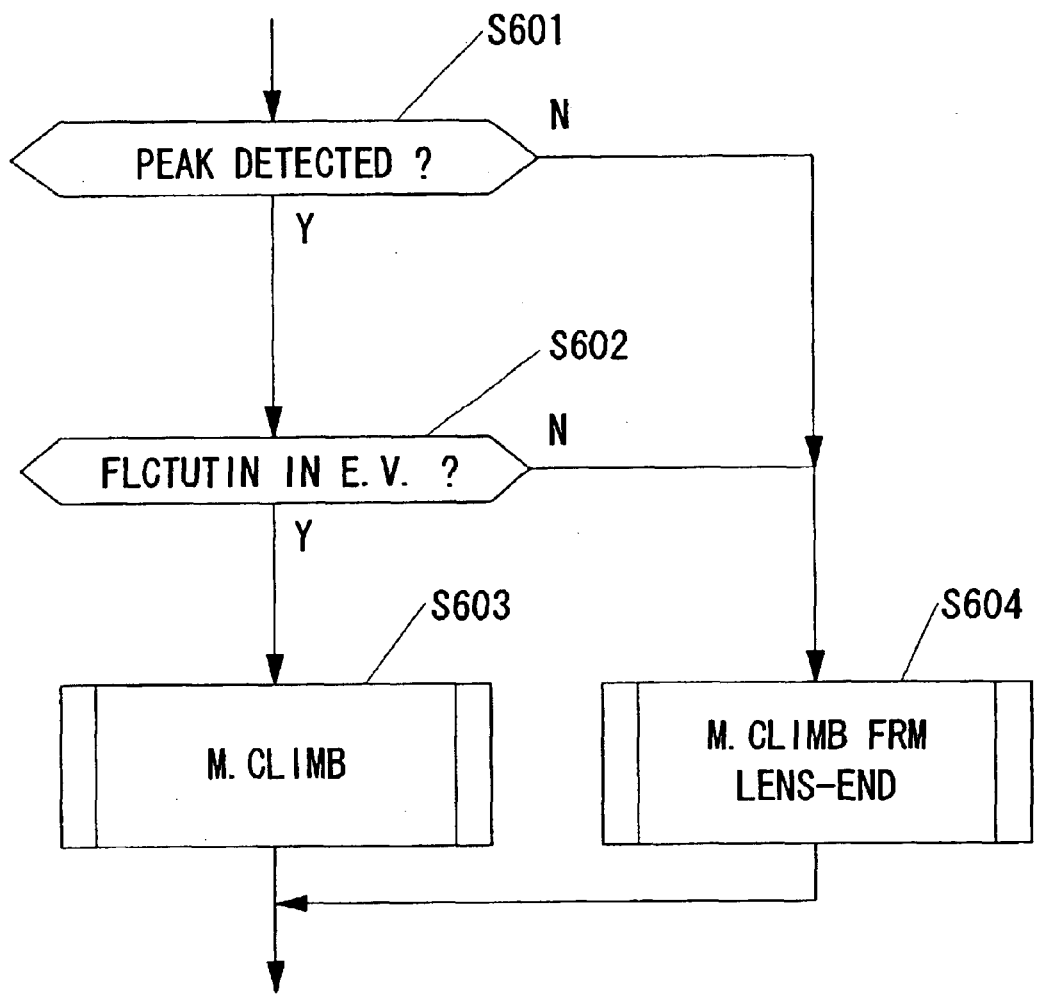
FIG. 7 is a flowchart detailing a processing of step S109 in FIG. 2 in accordance with a second embodiment.

A second embodiment is different only in the content of FIG. 5 of the first embodiment. As the other contents of a second embodiment are the same as those of the first embodiment, the explanation is omitted herein. In the following explanation, the relevant figures used in the first embodiment are referred to respectively when appropriate. FIG. 7 is a flowchart detailing a processing of step S109 of FIG. 2 and is a processing corresponding to an embodiment of FIG. 5 of the first embodiment.

Steps S601~S603 in FIG. 7 are the same as steps S401~S403 in FIG. 5. As only step S404 of FIG. 5 and step S604 of FIG. 7 are different, a following explanation will be concentrated on this difference. In step S602, when it is judged that a fluctuation in focus evaluation value is not monotonous, a flow proceeds to step S604. And when a peak point is not detected in step S601, a flow proceeds to step S604. In step S604, a mountain climb focusing mode starting from an end of a lens is selected.

Namely, although a full range scan focusing mode is selected in step S404 of the first embodiment, a second embodiment selects a mountain climb focusing mode starting from an end of a lens. When a fluctuation in focus evaluation value is not monotonous, there is a high possibility that there might be a change in an object due to a panning, a composition change and the like. In this case, a choice of a mountain climb focusing mode starting from an end of a lens rather than a present lens position is likely to realize a faster focusing. Also, when an in-focus position is detected in the middle of a focusing operation, a mountain climb focusing mode starting from an end of a lens enables to achieve a faster focusing than a full ranges can focusing mode scanning across a full movement range.

Thus, when rebooting a focusing operation, as an appropriate focusing mode is selectable in response to a change in an object, a faster focusing (auto focus) can be realized.

Figure 8:
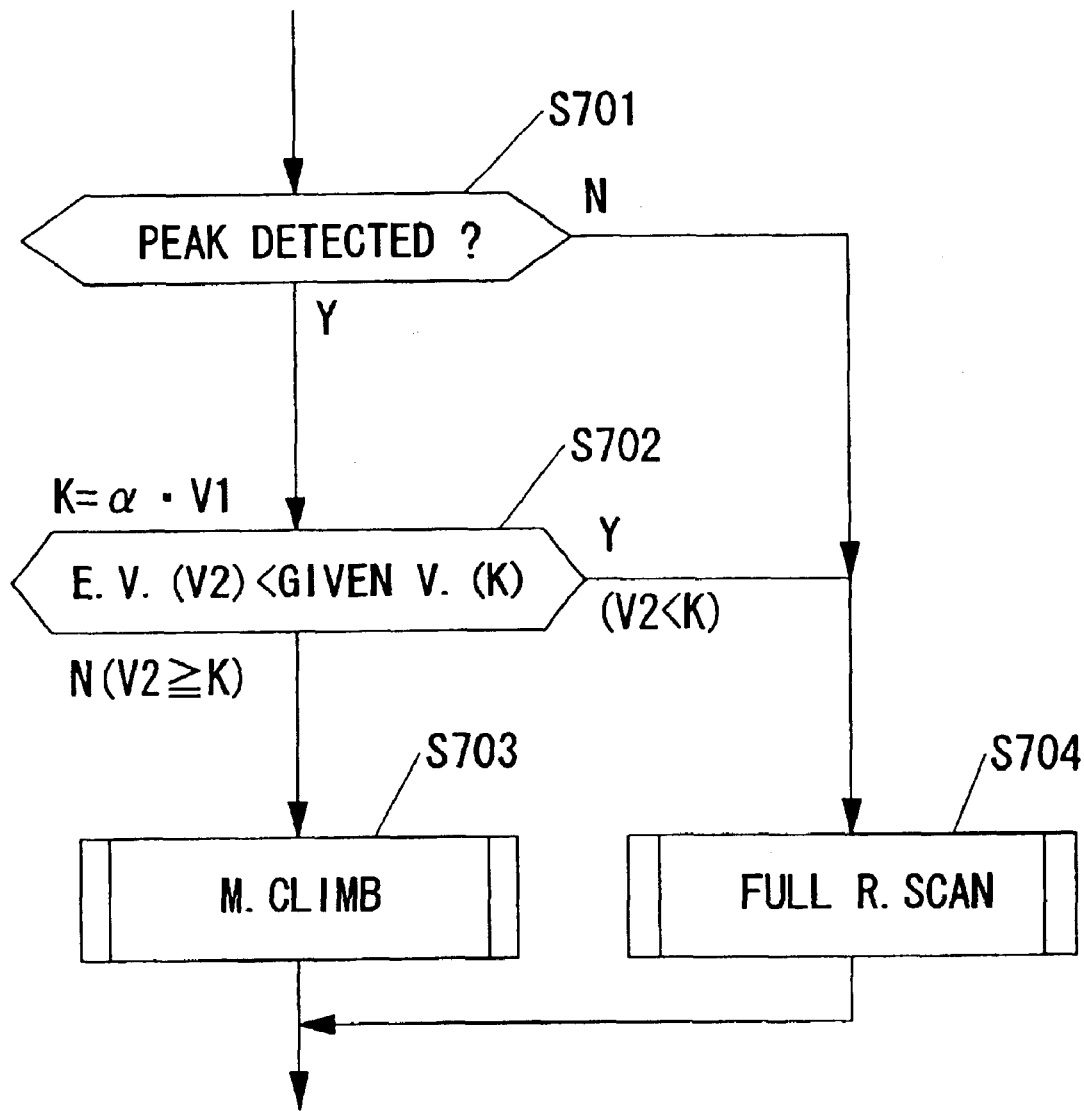
FIG. 8 is a flowchart detailing a processing of step S109 in FIG. 2 in accordance with a third embodiment.

A third embodiment is different only in the content of FIG. 5 of the first embodiment. As the other contents of a third embodiment are the same as those of the first embodiment, the explanation is omitted herein. In the following explanation, the relevant figures used in the first embodiment are referred to respectively when appropriate. FIG. 8 is a flowchart detailing a processing of step S109 of FIG. 2 and is a processing corresponding to an embodiment of FIG. 5 of the first embodiment.

In step S701, it is judged whether or not a preceding focus operation detected an in-focus point. In other words, it is judged whether or not a preceding focus operation detected a peak value of focus evaluation value. When a peak value could not be detected, it is attributable to a low contrast or so. In step S701, when it is judged that a peak value is detected, a flow proceeds to step S702.

In step S702, it is judged whether focus evaluation value V2 at a time of rebooting a focusing operation is smaller than given value K or not. In step S702, when focus evaluation value V2 is judged smaller than a given value K (V2<K), a flow proceeds to step S704 and a full range scan focusing mode is executed. In step S702, when focus evaluation value V2 is judged larger than given value K (V2≧K), a flow proceeds to step S703 and a mountain climb focusing mode is executed. A mountain climb focusing mode and a full range scan focusing mode are as shown in FIGS. 3 and 4. When a peak point is not detected in step S701, on the contrary, a flow proceeds to step S704 and a full range scan focusing mode is executed.

When focus evaluation value V2 at a time of rebooting a focusing operation is smaller than given value k, a selection of a full range scan focusing mode is made.

In a case where focus evaluation value V2 at a time of rebooting a focusing operation is smaller than given value k, there is a high possibility that a noticeable change might happen to an object. Thus, a selection of a full ranges can focusing mode provides a high provability of enabling a faster focusing. When focus evaluation value V2 at a time of rebooting a focus operation is larger than given value k, even if focus evaluation value V2 fluctuates, a lens is likely to be adjacent to an in-focus point. In this case, a selection of a mountain climb focusing provides a high provability of enabling a faster focusing. Accordingly, when rebooting a focusing operation in C-AF mode, as an appropriate focusing mode is selectable in response to changes of an object, a faster focusing (auto focus) can be realized.

It is assumed that given value K is a value that multiplies focus evaluation value V1 at a preceding focus by fixed coefficient á. That is, it is a value calculated based upon focus evaluation value at a time of finishing a preceding focusing operation or a value of a given ratio with reference to focus evaluation value at a time of finishing a preceding focusing operation. Accordingly, it is judged whether an object has changed noticeably or not compared with a preceding in-focus status á is data obtainable through various experiments or simulations.

Figure 9:
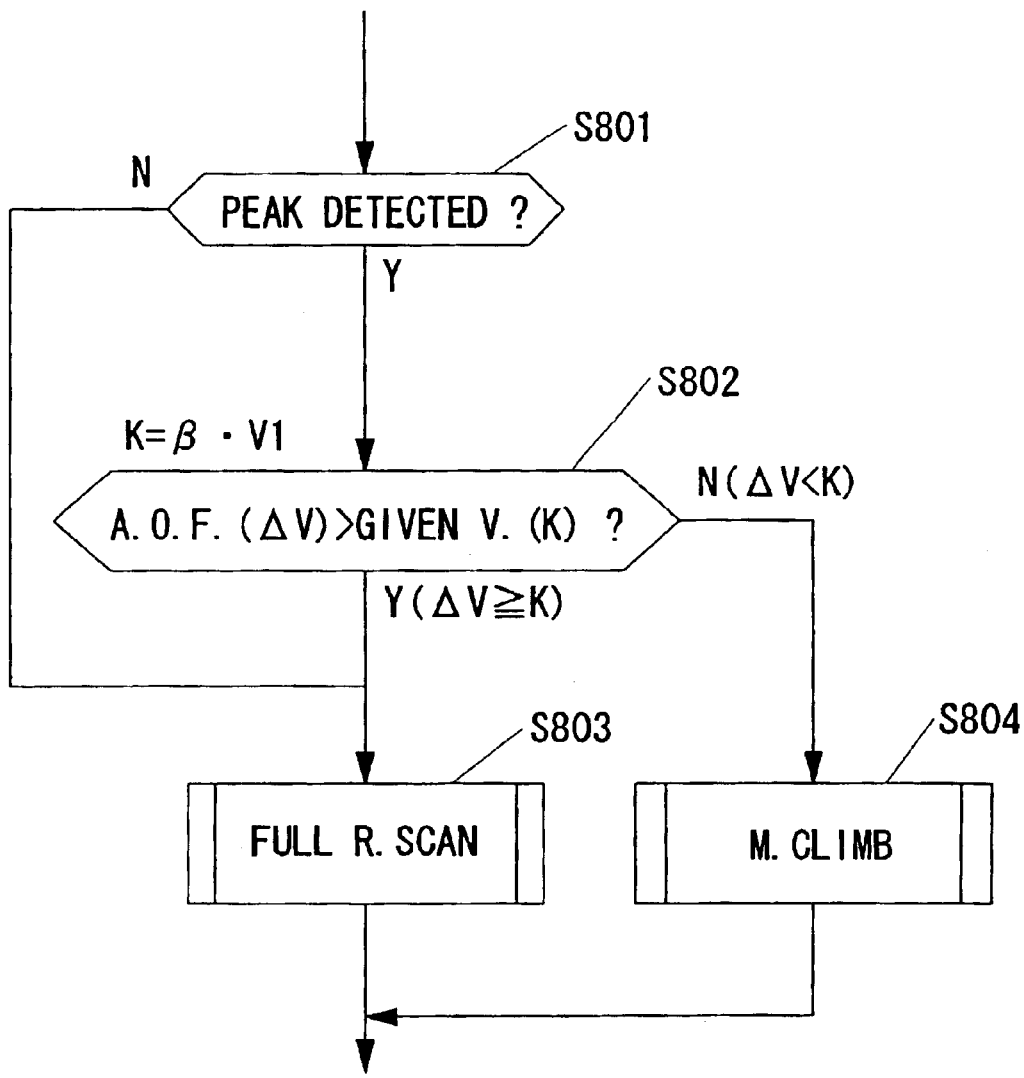
FIG. 9 is a flowchart detailing a processing of step S109 in FIG. 2 in accordance with a fourth embodiment.

A forth embodiment is different only in the content of FIG. 5 of the first embodiment. As the other contents of a forth embodiment are the same as those of the first embodiment, the explanation is omitted herein. In the following explanation, the relevant figures used in the first embodiment are referred to respectively when appropriate. FIG. 9 is a flow chart detailing a processing of step S109 of FIG. 2 and is a processing corresponding to an embodiment of FIG. 5 of the first embodiment.

In step S801, it is judged whether a preceding focusing operation detected a peak point or not. In other words, it is judged whether or not a preceding focusing operation detected a peak value of focus evaluation value. When a peak value could not be detected, it is attributable to a low contrast or so. In step S801, when a peak value is judged detected, a flow proceeds to step s802.

In step S802, a difference $\Delta V$ between focus evaluation value V2 at a time of rebooting a focusing operation and focus evaluation value V1 at a preceding focus point, namely, amount of a fluctuation in focus evaluation value $\Delta V$ is calculated. And it is judged whether amount of a fluctuation in focus evaluation value $\Delta V$ is smaller or larger than given value K. In step S802, when amount of a fluctuation in focus evaluation value $\Delta V$ is judged smaller than given value K ($\Delta V<K$), a flow proceeds to step S804 and a mountain climb focusing mode is executed. In step S802, when amount of a fluctuation in focus evaluation value $\Delta V$ is judged larger than given value K ($\Delta V\geq K$), a flow proceeds to step S803 and a full range scan focusing mode is executed. A mountain climb and full range scan focusing modes are shown as in FIGS. 3 and 4. In step S801, when it is judged that a peak value is not detected, a flow proceeds to step s803 and a full range scan focusing mode is executed.

Accordingly, in a case where amount of a fluctuation in focus evaluation value ΔV at a time of rebooting a focusing operation is more than given value k, a choice of a full range scan focusing mode is made. When amount of a fluctuation in focus evaluation value ΔV at a time of rebooting a focusing operation is more than given value k, there is a high possibility that a noticeable change has happened to an object. Thus, an employment of a full range scan focusing mode has a high provability of realizing a faster focusing. On the other hand, When amount of a fluctuation in focus evaluation value ΔV at a time of rebooting a focusing operation is smaller than given value k, even if focus evaluation value V2 fluctuates, a lens is likely to be nearby an in-focus point. In this case, an employment of a mountain climb focusing mode provides a high provability of achieving a faster focusing. Accordingly, as an appropriate focusing mode at a time of rebooting a focusing operation in C-AF mode or so is selectable in response to a change in an object, a faster focusing (auto focus) can be achieved.

Amount of a fluctuation in focus evaluation value ΔV can be described as amount of a fluctuation in focus evaluation value at a time of rebooting with reference to focus evaluation value at a time of finishing a preceding focusing operation. And let given value K be a value multiplying focus evaluation value V1 by fixed coefficient â. Therefore, it can be judged whether or not an object has changed noticeably compared with a preceding in-focus status â is data obtainable through various experiments or simulations.

Figure 10:
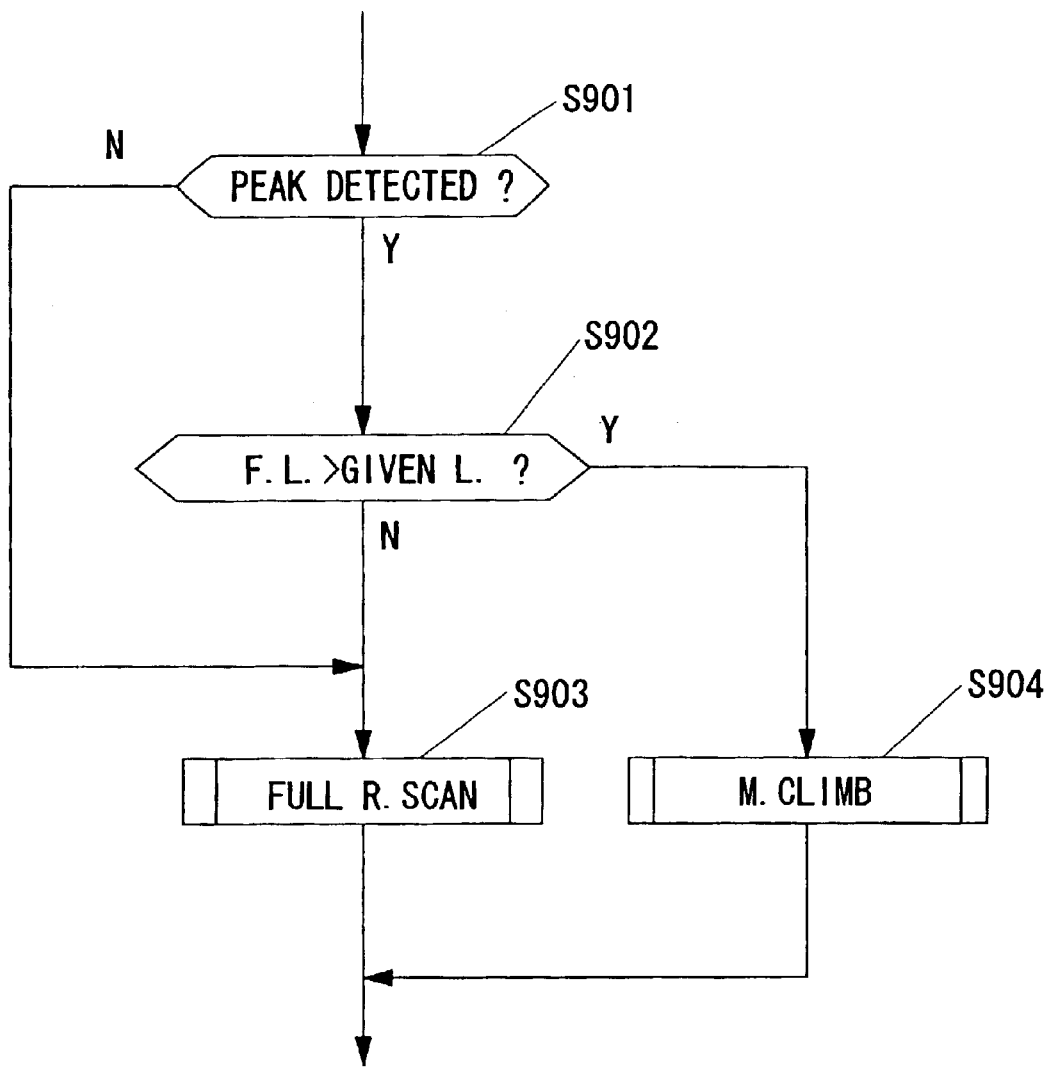
FIG. 10 is a flowchart detailing a processing of step S109 in FIG. 2 in accordance with a fifth embodiment.

A fifth embodiment is different only in the content of FIG. 5 of the first embodiment. As the other contents of a fifth embodiment are the same as those of the first embodiment, the explanation is omitted herein. In the following explanation, the relevant figures used in the first embodiment are referred to respectively when appropriate. FIG. 10 is a flowchart detailing a processing of step S109 of FIG. 2 and is a processing corresponding to an embodiment of FIG. 5 of the first embodiment.

In step S901, it is judged whether or not a preceding focusing operation detected an in-focus point. In other words, it is judged whether a peak value of focus evaluation value was detected or not. When a peak value could not be detected, it is attributable to a low contrast or so. In step S901, it is judged when a peak value is detected, a flow proceeds to step S902. In step S902, it is judged whether a focal length of taking-lens 101 as one of shooting conditions is greater or not. In step S902, when a focal length is judged greater than a given length, a flow proceeds to step S904 and a mountain climb focusing mode is executed. Instep S902, when a focal length is judged less than a given length, a flow proceeds to step S903 and a full range scan focusing mode is executed. A mountain climb and full range scan focusing modes are shown as in FIGS. 3 and 4. In step S901, when it is judged that a peak value is not detected, a flow proceeds to step s903 and a full range scan focusing mode is executed.

When a focal length of taking-lens 101 is less than a given length, a depth of field becomes deep and objects in the background are easy to come into focus. To avoid this, a full range scan focusing mode is selected and focuses a lens on an object at a closest distance away. Namely, when there is a plurality of peak values, a peak value at a closest distance away is to come into focus. And when a focal length is less than a given length (a short focal length), as a movement of taking-lens 101 is a very little, a focusing operation can be performed in a short time even if a full range scan focusing mode is employed. Even in a case where there is no difference in a focusing speed between a mountain climb focusing mode and a full range scan focusing mode, all focus evaluation values in a case of a full range scan focusing mode have been obtained. Therefore, even if objects at infinity away and a closest distance away compete against each other respectively, it is possible to achieve an accurate focus on an object at a closest distance away.

Further, when a focal length is less than a given value, as a depth of field becomes greater, the region of sharp focus extends. This means that a region with focus evaluation value being more than a given value is broad. In a mountain climb focusing mode, for minimizing amount of a lens overrunning of an in-focus point, amount of movement of taking-lens 101 may be made small when focus evaluation value is larger than a given value. Thus, with a focal length being less than a given length, a mountain climb focusing mode would take time to achieve an in-focus point. From the view point of the foregoing, a use of a full range scan focusing method becomes effective when a focal length is less than a given length.

Accordingly, by grasping a difference in a focal length of taking-lens 101, a change of an object is properly presumed. As a result, as an appropriate focusing mode is selectable in response to a change of an object, a faster focusing (auto focus) can be obtained.

Figure 11:
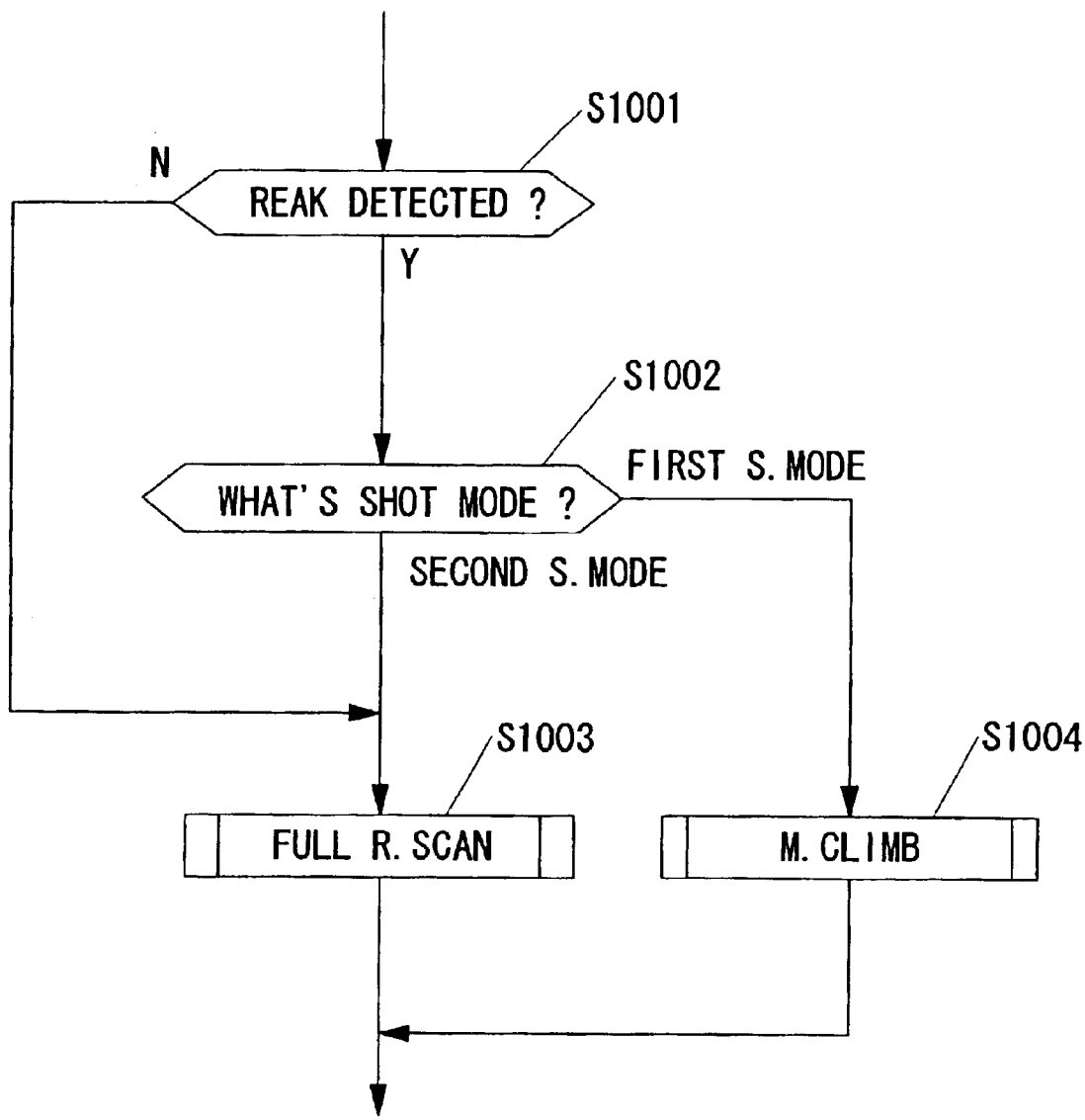
FIG. 11 is a flowchart detailing a processing of step S109 in FIG. 2 in accordance with a sixth embodiment.

A sixth embodiment is different only in the content of FIG. 5 of the first embodiment. As the other contents of a sixth embodiment are the same as those of the first embodiment, the explanation is omitted herein. In the following explanation, the relevant figures used in the first embodiment are referred to respectively when appropriate. FIG. 11 is a flowchart detailing a processing of step S109 of FIG. 2 and is a processing corresponding to an embodiment of FIG. 5 of the first embodiment.

In step S1001, it is judged whether or not a preceding focusing operation detected a peak point. In other words, it is judged whether or not a preceding focusing operation detected a peak value of focus evaluation value. When a peak value could not be detected, it is attributable to a low contrast or so. In step S1001, when a peak value is detected, a flow proceeds to step s1002.

In step S1002, it is judged whether a shooting mode as one of shooting conditions is a #1 shooting mode or a #2 shooting mode. Typically, there are a normal, a long distance, a portrait, sports, close-up and night scenery shooting modes. A #1 shooting mode includes a portrait, sports and close-up shooting modes. In a portrait and sports shooting modes, as an object is in motion, it is necessary to follow a motion. In a close-up mode, as a shooting distance from a camera to an object is apt to change, it is necessary to respond to a change and achieve a faster focus operation. Namely, a #1 shooting mode is the one that an object moves or a shooting distance is apt to change. On the other hand, a #2 shooting mode includes a long distance and night scenery shooting modes. Objects in these modes are motionless. That is, a #2 shooting mode is the one that a shooting distance is hard to change.

In step S1002, when it is judged that a mode is a #1 shooting mode, a flow proceeds to step S1004 and a mountain climb focusing mode is executed. In step S1002, when it is judged that a mode is a #2 shooting mode, a flow proceeds to step S1003 and a full range scan focusing mode is executed. A mountain climb and full range scan focusing modes are shown as in FIGS. 3 and 4. In step S1001, when it is judged that a peak point is not detected, a flow proceeds to step s1003 and a full range scan focusing mode is executed.

Accordingly, by grasping a difference in a shooting mode, a change of an object is properly presumed and an appropriate focus operation mode is to be selectable in response to a shooting mode. As a result, a faster focusing (auto focus) can be obtained in response to a movement of an object or a change in a shooting distance. It can be said that a #1 shooting mode is a mode with an object at a close distance away and a #2 shooting mode is a mode with an object at a long distance away. There is a tendency that in a shooting mode with the object at a close distance away, an object is typically apt to become out of focus and in a long distance shooting mode with the object at a long distance away, an object is hard to be out of focus.

Figure 12:
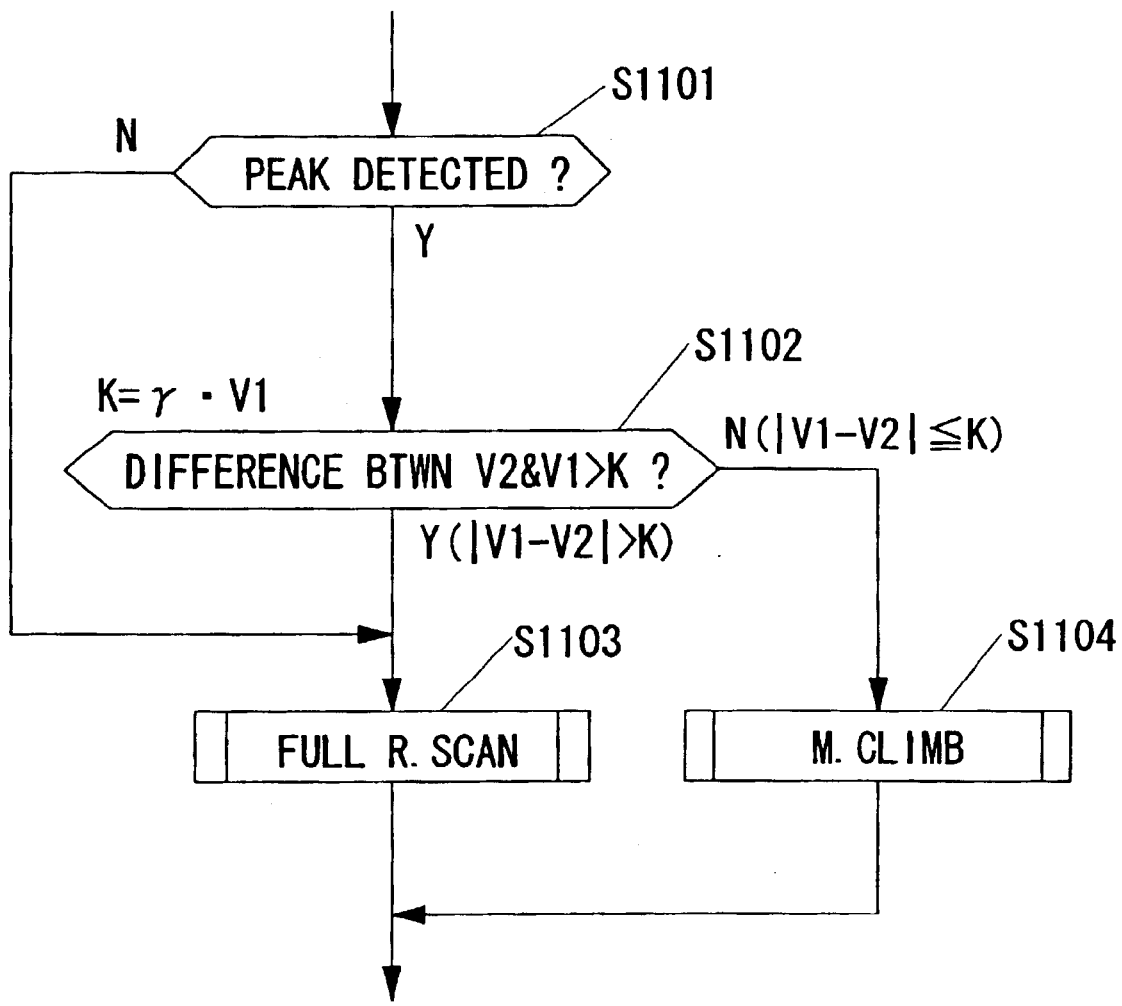
FIG. 12 is a flowchart detailing a processing of step S110 in FIG. 2 in accordance with a seventh embodiment.

A seventh embodiment is different only in the content of an AF mode selection at a time of turning on a halfway-depress switch of FIG. 6 of the first embodiment. As the other contents of a seventh embodiment are the same as those of the first embodiment, the explanation is omitted herein. In the following explanation, the relevant figures used in the first embodiment are referred to respectively when appropriate. FIG. 12 is a flowchart detailing a processing of step S110 of FIG. 2 and is a processing corresponding to an embodiment of FIG. 6 of the first embodiment.

In step S1101, it is judged whether or not a preceding focusing operation detected a peak point. In other words, it is judged whether or not a peak value of focus evaluation value was detected at a preceding focusing operation. When a peak value could not be detected, it was attributable to a low contrast or so. In step S1101, when it is judged that a peak value was detected, a flow proceeds to step s1102.

In step S1102, it is judged whether an absolute value of a difference between focus evaluation value V2 at a time of turning on halfway-depress switch 1163 and focus evaluation value V1 at a preceding focusing operation is larger or smaller than given value K. Focus evaluation value V1 at a preceding focusing operation has been stored into a memory. In step S1102, when an absolute value of a difference is judged less than given value K ($|V1-V2|\leq K$), a flow proceeds to step S1104 and a mountain climb focusing mode is executed. In step S1102, when an absolute value of a difference is judged larger than given value K ($|V1-V2|\geq K$), a flow proceeds to step s1103 and a full range scan focusing mode is executed. A mountain climb and full range scan focusing modes are shown as FIGS. 3 and 4. On the other hand, when a peak value was not detected in step S1101, a flow proceeds to step S1103 and a full range scan focusing mode is executed.

Accordingly, when an absolute value of a difference is larger than given value K, a choice of a full scan focusing mode is made. In a case where an absolute value of a difference is larger than given value K, there is a high possibility that an object has changed noticeably. Thus, a use of a full range scan focusing mode provides a high provability of achieving a faster focusing. On the contrary, when an absolute value of a difference is not larger or less than given value K, even if focus evaluation value V2 fluctuates, there is a high possibility that a lens is close to an in-focus point. In this case, a use of a mountain climb focusing mode provides a high provability of realizing a faster focusing. Accordingly, in a focusing operation at a time of turning on halfway-depress switch 1163, as an appropriate focusing mode is selectable in response to a change of an object, a faster focusing (auto focus) can be obtained.

An absolute value of a difference in focus evaluation value can be said to be amount of change in focus evaluation value. And it is assumed that given value K is a value multiplying focus evaluation value V1 by fixed coefficient γ. With this formula, it can be judged whether or not an object has changed noticeably in comparison with a preceding in-focus status. γ is data obtainable through various experiments or simulations.

In the foregoing embodiments, examples have been referred to using a digital still camera, but it is not necessary to restrict examples to a digital still camera only. This invention can apply to all of the cameras that perform a focusing operation by a contrast method using an imaging element such as CCD and the like.

In judging a status of a fluctuation, an example that the embodiment uses a code of differential value has been explained, but this invention is not necessary to be limited to this example. A status of a fluctuation may be judged by another way. Namely, every way capable of detecting whether or not a fluctuation in focus evaluation value is monotonous may be utilized.

Regarding a reboot of a focusing operation, an example that the foregoing embodiment reboots a focusing operation every a given time interval in C-AF mode has been explained, but this invention is not necessary to be limited to this embodiment. A focusing operation may be rebooted responding to a level of focus evaluation value that is higher or lower than a certain level. Namely, as a rebooting condition for repeating a focusing operation in C-AF mode, any condition may be acceptable and further, this invention is not necessary to be limited to a reboot in C-AF mode. This invention may apply to every case where, in a camera, once a lens movement stops, a reboot of a focusing operation is required. In the foregoing embodiment, an example that a high-frequency component is extracted by a band pass filter and focus evaluation value is obtained by integrating an absolute value of a extracted high-frequency component has been explained, but this invention is not necessary to be limited to this example. A high pass filter may extract a high-frequency component. Also, another method may calculate focus evaluation value. That is, any method capable of evaluating a focus status with focus evaluation value calculated based upon an imaging signal picked up by an imaging element may be usable.

In the foregoing, various embodiments and modifications have been explained so far, but this invention is not limited to them. Another embodiments, modifications, equivalent arrangements and the like conceivable within the spirit and scope of this invention are intended to be included in this invention.

What is claimed is:

1. A camera comprising:
   an imaging element that picks up an image of an object through a taking-lens,
   an evaluation value calculator that calculates focus evaluation value based upon an imaging signal output by the imaging element,
   a selector that selects one focusing mode from a plurality of focusing modes,
   a focusing device that performs a focusing operation of the taking-lens based upon the focus evaluation value and the selected focusing mode and
   a rebooting device that reboots the focusing operation after the focusing operation performed by the focusing device finishes, an evaluation value memory device that obtains and stores a plurality of focus evaluation values calculated by the evaluation value calculator in time sequence after the focusing operation performed by the focusing device finishes and a fluctuation evaluator that evaluates fluctuation in focus evaluation value based upon a plurality of focus evaluation values stored into the evaluation value memory device, wherein, when the rebooting device reboots the focusing operation, the selector selects one focusing mode from a plurality of focusing modes based upon an evaluation result of fluctuation in focus evaluation value by the fluctuation evaluator.

2. The camera set forth in claim 1, wherein the plurality of focusing modes have a mountain climb focus mode using a so-called mountain climb control method that seeks a peak value of the focus evaluation value while moving the taking-lens in a direction with the focus evaluation value getting larger every a single cycle of calculating the focus evaluation value and a full range scan focus mode using a so-called full range scanning control method that seeks a peak value of the focus evaluation value by scanning across an overall movement range for use in focusing the taking-lens.

3. The camera set forth in claim 2, wherein, when the fluctuation evaluator judges that fluctuation in focus evaluation value is monotonous, the selector selects the mountain climb focus mode.

4. The camera set forth in claim 3, wherein the fluctuation in focus evaluation value being monotonous means focus evaluation value being a monotonous increase or decrease within a given period of time.

5. The camera set forth in claim 2, wherein, when the fluctuation evaluator judges that fluctuation in focus evaluation value is not monotonous, the selector selects the full range scan control mode.

6. The camera set forth in claim 2, wherein, when the fluctuation evaluator judges that fluctuation in focus evaluation value is not monotonous, the selector moves the taking-lens to an end of the movement range and selects the mountain climb focus mode.

7. The camera set forth in claim 6, wherein the end of the movement range is an end at a closest distance away.

8. A camera comprising:

an imaging element that picks up an image of an object through a taking-lens, an evaluation value calculator that calculates focus evaluation value based upon an imaging signal output by the imaging element, a selector that selects one focusing mode from a plurality of focusing modes, a focusing device that performs a focusing operation of the taking-lens based upon the focus evaluation value and the selected focusing mode and a rebooting device that reboots the focusing operation after the focusing operation performed by the focusing device finishes, wherein the plurality of focusing modes have a mountain climb focus mode using a so-called mountain climb control method that seeks a peak value of the focus evaluation value while moving the taking-lens in a direction with the focus evaluation value getting larger every a single cycle of calculating the focus evaluation value and a full range scan focus mode using a so-called a full range scanning focus control method that seeks a peak value of focus evaluation value by scanning across an overall movement range for use in focusing the taking-lens and when the rebooting device reboots the focusing operation, the selector selects the full range scan focus mode when the selector judges that focus evaluation value at rebooting is smaller than a given value.

9. The camera set forth in claim 8, wherein the given value is a value calculated based upon focus evaluation value at concluding the focusing operation.

10. A camera comprising:

an imaging element that picks up an image of an object through a taking-lens, an evaluation value calculator that calculates focus evaluation value based upon an imaging signal output by the imaging element, a selector that selects one focusing mode from a plurality of focusing modes, a focusing device that performs a focusing operation of the taking-lens based upon the focus evaluation value and the selected focusing mode and a rebooting device that reboots the focusing operation after the focusing operation performed by the focusing device finishes, wherein, when the rebooting device reboots the focusing operation, the selector selects the one focusing mode based upon a shooting condition.

11. The camera set forth in claim 10, wherein the shooting condition is a condition based upon a focal length of the taking-lens.

12. The camera set forth in claim 11, wherein the plurality of focusing modes have a mountain climb focus mode using a so-called mountain climb control method that seeks a peak value of the focus evaluation value while moving the taking-lens in a direction with the focus evaluation value getting larger every a single cycle of calculating the focus evaluation value and a full range scan focus mode using a so-called a full range scanning focus control method that seeks a peak value of focus evaluation value by scanning across an overall movement range for use in focusing the taking-lens, wherein, when the selector judges that the focal length is shorter than a given length, the selector selects the full range scan focus mode.

13. The camera set forth in claim 10, wherein the shooting condition is a condition based upon a plurality of shooting modes predetermining a plurality of shooting conditions in accordance with a shooting situation.

14. The camera set forth in claim 13, wherein the plurality of focusing modes have a mountain climb focus mode using a so-called mountain climb control method that seeks a peak value of the focus evaluation value while moving the taking-lens in a direction with the focus evaluation value getting larger every a single cycle of calculating the focus evaluation value and a full range scan focus mode using a so-called a full range scanning focus control method that seeks a peak value of focus evaluation value by scanning across an overall movement range for use in focusing the taking-lens.

15. The camera set forth in claim 14, wherein the selector selects the mountain climb focus mode when the shooting mode is any of a portrait, a close-up or a sports shooting mode.

16. The camera set forth in claim 14, wherein, when the shooting mode is any of a long distance or a night scenery shooting mode, the selector selects the full range scan focus mode.

17. A camera comprising:

an imaging element that picks up an image of an object through a taking-lens, an evaluation value calculator that calculates focus evaluation value based upon an imaging signal output by the imaging element, a selector that selects one focusing mode from a plurality of focusing modes, a focusing device that performs a focusing operation of the taking-lens based upon the focus evaluation value and the selected focusing mode and a rebooting device that reboots the focusing operation after the focusing operation performed by the focusing device finishes, wherein the plurality of focusing modes include a full range scan focus mode using a so-called full scanning control method that seeks a peak value of the focus evaluation value by scanning across an overall range for use in focusing the taking-lens and when the rebooting device reboots the focusing operation, the selector selects the full range scan focus mode when amount of fluctuation in the focus evaluation value at rebooting with reference to the focus evaluation value at concluding the focusing operation is larger than a given value.

18. The camera set forth in claim 17, wherein the given value is a value obtained based upon focus evaluation value at concluding the focusing operation.

19. The camera set forth in claim 17, wherein the plurality of focusing modes include a mountain climb focus mode using a so-called mountain climb control method that seeks a peak value of the focus evaluation value while moving the taking-lens in a direction with the focus evaluation value getting larger every a single cycle of calculating the focus evaluation value.

20. A camera comprising:

an imaging element that picks up an image of an object through a taking-lens, an evaluation value calculator that calculates focus evaluation value based upon an imaging signal output by the imaging element, a selector that selects one focusing mode from a plurality of focusing modes including a focusing mode using a so-called full scanning control method that seeks a peak value of the focus evaluation value by scanning across an overall range for use in focusing the taking-lens, a focusing device that performs a focusing operation of the taking-lens based upon the focus evaluation value and the selected focusing mode, an AF selector that selects a so-called continuous AF mode continuously repeating the focusing operation by the focusing device and a rebooting device that reboots the focusing operation after the focusing operation performed by the focusing device finishes, wherein, when the focusing device is disable to perform the focusing operation in the continuous AF mode selected by the AF selector, the selector selects a focusing, mode using the full range scanning control method when a focusing operation is rebooted by the rebooting device.

21. A camera comprising:

an imaging element that picks up an image of an object through a taking-lens, an evaluation value calculator that calculates focus evaluation value based upon an imaging signal output by the imaging element, a focus instruction switch that instructs a focusing operation when a switch is turned on, a selector that selects at least one focusing mode from any of a first focusing mode or a second focusing mode based upon the focus evaluation value when the focus instruction switch is turned on and a focusing device that performs a focusing operation of the taking-lens based upon the focus evaluation value and the selected one focusing mode when the focus instruction switch is turned on.

22. The camera set forth in claim 21, wherein the first focusing mode is a so-called mountain climb control method that seeks a peak value of the focus evaluation value while moving the taking-lens in a direction with the focus evaluation value getting larger every a single cycle of calculating the focus evaluation value and the second focusing mode is a so-called a full range scanning focus control method that seeks a peak value of focus evaluation value by scanning across an overall movement range for use in focusing the taking-lens.

23. The camera set forth in claim 22, wherein, when the focus evaluation value at a time of the focus instruction switch being turned on is larger than a given value, the selector selects the mountain climb control method.

24. The camera set forth in claim 22, wherein, when the focus evaluation value at a time of the focus instruction switch being turned on is smaller than a given value, the selector selects the full range scanning focus control method.

25. A camera comprising:

an imaging element that picks up an image of an object through a taking-lens, an evaluation value calculator that calculates focus evaluation value based upon an imaging signal output by the imaging element, a selector that selects at least one focusing mode from any of a first focusing mode or a second focusing mode, a focusing device that performs a focusing operation of the taking-lens based upon the focus evaluation value and the selected one focusing mode, an evaluation memory device that stores the focus evaluation value when a focusing operation finishes, a re-focus instruction switch that instructs again the focusing device to perform a focusing operation when a switch is turned on and an evaluation value comparison device that obtains amount of fluctuation in the focus evaluation value at a time of the re-focus instruction switch being turned on with reference to the focus evaluation value stored by the evaluation value memory device, wherein, when the re-focus instruction switch is turned on, the selector selects the one focusing mode based upon the amount of fluctuation obtained by the evaluation value comparison device.

26. The camera set forth in claim 25, wherein the first focusing mode is a so-called mountain climb control method that seeks a peak value of the focus evaluation value while moving the taking-lens in a direction with the focus evaluation value getting larger every a single cycle of calculating the focus evaluation value and the second focusing mode is a so-called a full range scanning focus control method that seeks a peak value of focus evaluation value by scanning across an overall movement range for use in focusing the taking-lens.

27. The camera set forth in claim 26, wherein, when the amount of fluctuation is smaller than a given value, the selector selects the mountain climb control method.

28. The camera set forth in claim 27, wherein the given value is a value obtained based upon the focus evaluation value stored into the evaluation value memory device.

29. The camera set forth in claim 26, wherein, when the amount of fluctuation is larger than a given value, the selector selects the full range scanning focus control method.

30. A camera comprising:

an imaging element that picks up an image of an object through a taking-lens, an evaluation value calculator that calculates focus evaluation value based upon an imaging signal output by the imaging element, a selector that selects one focusing mode from a plurality of focusing modes including a focusing mode using a so-called full range scanning focus control method that seeks a peak value of focus evaluation value by scanning across an overall movement range for use in focusing the taking-lens, a focusing device that performs a focusing operation of the taking-lens based upon the focus evaluation value and the selected focusing mode, an AF selector that selects a so-called continuous AF mode continuously repeating the focusing operation by the focusing device and a focus instruction switch that instructs the focusing device to perform a focusing operation when a switch is turned on, wherein, when the focusing device is disable to perform the focusing operation in the continuous AF mode selected by the AF selector, the selector selects a focusing mode using the full range scanning control method at a time the focus instruction switch is turned on.

31. The camera set forth in claim 30, wherein the plurality of focusing modes include a focusing mode using a so-called mountain climb control method that seeks a peak value of the focus evaluation value while moving the taking-lens in a direction with the focus evaluation value getting larger every a single cycle of calculating the focus evaluation value.

* * * * *